US012221330B2

(12) United States Patent
Theos et al.

(10) Patent No.: US 12,221,330 B2
(45) Date of Patent: Feb. 11, 2025

(54) LIGHTING FLOOR ON SIDES OF MATERIAL HANDLING VEHICLE TO INDICATE LIMITED OR NON-LIMITED AREA

(71) Applicant: Crown Equipment Corporation, New Bremen, OH (US)

(72) Inventors: Sebastian Theos, Vaterstetten (DE); Andreas Simon, Munich (DE); Juergen Buchmann, Pliening (DE); René Konzack, Isen (DE); Christian Molnar, Schwindegg (DE); Alfonso Costas, Munich (DE)

(73) Assignee: Crown Equipment Corporation, New Bremen, OH (US)

( * ) Notice: Subject to any disclaimer, the term of this patent is extended or adjusted under 35 U.S.C. 154(b) by 760 days.

(21) Appl. No.: 17/248,997

(22) Filed: Feb. 17, 2021

(65) Prior Publication Data

US 2021/0261391 A1 Aug. 26, 2021

Related U.S. Application Data

(60) Provisional application No. 62/979,916, filed on Feb. 21, 2020.

(51) Int. Cl.
*B66F 9/075* (2006.01)
*B60Q 1/32* (2006.01)
(Continued)

(52) U.S. Cl.
CPC .............. *B66F 9/0755* (2013.01); *B60Q 1/32* (2013.01); *B60W 30/18009* (2013.01);
(Continued)

(58) Field of Classification Search
None
See application file for complete search history.

(56) References Cited

U.S. PATENT DOCUMENTS

| 4,083,422 A | 4/1978 | Blakeslee et al. |
| 4,266,106 A | 5/1981 | Fraser et al. |

(Continued)

FOREIGN PATENT DOCUMENTS

| CN | 101140470 A | 3/2008 |
| CN | 101939248 A | 1/2011 |

(Continued)

OTHER PUBLICATIONS

English of KR 101547564 B1 (Year: 2015).*

(Continued)

*Primary Examiner* — Luke D Ratcliffe
*Assistant Examiner* — Jempson Noel
(74) *Attorney, Agent, or Firm* — Stevens & Showalter LLP

(57) ABSTRACT

A method is provided for controlling a light source device associated with a materials handling vehicle, wherein the materials handling vehicle includes one or more sensing devices, comprising: sensing via the one or more sensing devices a first distance from a left side of the vehicle to a first boundary object and a second distance from a right side of the vehicle to a second boundary object; controlling the light source device to designate a first area to the left side of the vehicle as either a limited operation area or a non-limited operation area and to designate a second area to the right side of the vehicle as either a limited operation area or a non-limited operation area.

21 Claims, 22 Drawing Sheets

(51) Int. Cl.
  *B60W 30/18* (2012.01)
  *B62D 15/02* (2006.01)
  *G01S 7/481* (2006.01)
  *G01S 17/931* (2020.01)
  *G05D 1/00* (2024.01)
  *G05D 1/222* (2024.01)
  *G05D 1/223* (2024.01)
  *G06V 20/58* (2022.01)

(52) U.S. Cl.
  CPC ........ *B62D 15/021* (2013.01); *B66F 9/07581* (2013.01); *G01S 7/4815* (2013.01); *G01S 17/931* (2020.01); *G05D 1/0038* (2013.01); *G05D 1/005* (2013.01); *G05D 1/223* (2024.01); *G05D 1/2235* (2024.01); *G06V 20/58* (2022.01); *B60W 2554/4041* (2020.02); *B60W 2554/4049* (2020.02)

(56) References Cited

U.S. PATENT DOCUMENTS

| | | |
|---|---|---|
| 4,347,794 A | 9/1982 | Nordstroem |
| 4,849,735 A | 7/1989 | Kirtley et al. |
| 5,011,358 A | 4/1991 | Andersen et al. |
| 5,258,911 A | 11/1993 | Wellman et al. |
| 5,260,694 A | 11/1993 | Remahl |
| 5,652,486 A | 7/1997 | Mueller et al. |
| 6,208,916 B1 | 3/2001 | Hori |
| RE37,215 E | 6/2001 | Dammeyer et al. |
| 6,713,750 B2 | 3/2004 | Goddard |
| 6,784,800 B2 | 8/2004 | Orzechowski |
| 7,047,132 B2 | 5/2006 | Jacobs |
| 7,148,794 B2 | 12/2006 | Stigall |
| 7,219,769 B2 | 5/2007 | Yamanouchi et al. |
| 7,300,092 B2 | 11/2007 | Dunn |
| 7,408,314 B2 | 8/2008 | Hayashi |
| 7,561,254 B2 | 7/2009 | Koide |
| 7,849,955 B2 | 12/2010 | Crabill et al. |
| 7,899,597 B2 | 3/2011 | Vitale et al. |
| 7,987,050 B2 | 7/2011 | Tanaka et al. |
| 8,036,771 B2 | 10/2011 | Hayashi |
| 8,145,390 B2 | 3/2012 | Dix et al. |
| 8,220,169 B2 | 7/2012 | Goddard |
| 8,452,464 B2 | 5/2013 | Castaneda et al. |
| 8,477,025 B2 | 7/2013 | Campmans et al. |
| 8,515,629 B2 | 8/2013 | Medwin et al. |
| 8,698,612 B2 | 4/2014 | Toll |
| 8,731,777 B2 | 5/2014 | Castaneda et al. |
| 8,924,039 B2 | 12/2014 | Miller, IV et al. |
| 8,963,704 B2 | 2/2015 | Adami |
| 9,075,412 B2 | 7/2015 | Dixon et al. |
| 9,139,408 B2 | 9/2015 | Alveteg |
| 9,145,286 B2 | 9/2015 | Pfaff et al. |
| 9,230,419 B2 | 1/2016 | Beggs et al. |
| 9,317,037 B2 | 4/2016 | Byford et al. |
| 9,493,184 B2 | 11/2016 | Castaneda et al. |
| 9,541,922 B2 | 1/2017 | Tsujimoto et al. |
| 9,542,824 B2 | 1/2017 | Beggs et al. |
| 9,547,969 B2 | 1/2017 | Beggs et al. |
| 9,567,102 B1 | 2/2017 | Ross |
| 9,604,539 B1 | 3/2017 | Blignaut |
| 9,607,496 B2 | 3/2017 | Beggs et al. |
| 9,633,537 B2 | 4/2017 | Beggs et al. |
| 9,664,789 B2 | 5/2017 | Rosenblum et al. |
| 9,718,661 B1 | 8/2017 | Hoffman |
| 9,725,038 B2 | 8/2017 | Wu |
| 9,745,180 B2 | 8/2017 | Meijer et al. |
| 9,802,528 B2 | 10/2017 | Adami |
| 9,857,472 B2 | 1/2018 | Mheen et al. |
| 9,864,371 B2 | 1/2018 | Douglas et al. |
| 9,946,265 B2 | 4/2018 | Sullivan et al. |
| 10,023,142 B2 | 7/2018 | McGoldrick et al. |
| 10,053,286 B2 | 8/2018 | Sullivan et al. |
| 10,059,261 B2 | 8/2018 | Wu |
| 10,086,756 B2 | 10/2018 | Manci et al. |
| 10,118,537 B2 | 11/2018 | Kunii et al. |
| 10,216,193 B2 | 2/2019 | Gupta et al. |
| 10,220,768 B2 | 3/2019 | Damon |
| 10,220,844 B2 | 3/2019 | Ko et al. |
| 10,221,014 B2 | 3/2019 | Sullivan et al. |
| 10,222,215 B2 | 3/2019 | Holz |
| 10,242,514 B2 | 3/2019 | Harish et al. |
| 10,248,123 B2 | 4/2019 | Ichinose et al. |
| 10,261,511 B2 | 4/2019 | Masaki et al. |
| 10,280,054 B2 | 5/2019 | High et al. |
| 10,289,118 B2 | 5/2019 | Gopner |
| 10,317,448 B2 | 6/2019 | Streett et al. |
| 10,343,601 B2 | 7/2019 | Wu |
| 10,346,797 B2 | 7/2019 | Jacobus et al. |
| 10,365,117 B2 | 7/2019 | Harish et al. |
| 10,388,085 B2 | 8/2019 | Harish et al. |
| 10,402,772 B2 | 9/2019 | Terwilliger et al. |
| 10,429,833 B2 | 10/2019 | Schulz et al. |
| 10,466,692 B2 | 11/2019 | Douglas et al. |
| 10,528,828 B2 | 1/2020 | Eckman |
| 10,538,421 B2 | 1/2020 | Blevins et al. |
| 10,556,785 B2 | 2/2020 | Gopner et al. |
| 10,570,001 B2 | 2/2020 | Yahner |
| 10,591,627 B2 | 3/2020 | Frederick et al. |
| 10,611,615 B2 | 4/2020 | Valfridsson et al. |
| 10,663,314 B2 | 5/2020 | Harish et al. |
| 10,740,627 B2 | 8/2020 | Corcoran |
| 10,875,448 B2 | 12/2020 | Zevenbergen et al. |
| 2002/0190849 A1* | 12/2002 | Orzechowski .......... F16P 3/141 340/425.5 |
| 2008/0051952 A1 | 2/2008 | Tushaus |
| 2008/0306691 A1 | 12/2008 | Louis |
| 2009/0189132 A1 | 7/2009 | Meijer et al. |
| 2010/0114405 A1 | 5/2010 | Elston et al. |
| 2011/0046813 A1* | 2/2011 | Castaneda ........... B66F 9/07568 701/41 |
| 2011/0153139 A1 | 6/2011 | Erb et al. |
| 2011/0166721 A1 | 7/2011 | Castaenda et al. |
| 2012/0025964 A1* | 2/2012 | Beggs .................... G08G 1/166 340/435 |
| 2012/0078471 A1 | 3/2012 | Siefring et al. |
| 2013/0096735 A1 | 4/2013 | Byford et al. |
| 2014/0158468 A1* | 6/2014 | Adami ................. B60Q 1/0035 187/222 |
| 2015/0138002 A1 | 5/2015 | Beggs et al. |
| 2015/0158428 A1 | 6/2015 | Beggs et al. |
| 2015/0170493 A1 | 6/2015 | Beggs et al. |
| 2016/0090038 A1 | 3/2016 | Briggs et al. |
| 2016/0090283 A1 | 3/2016 | Svensson et al. |
| 2016/0090284 A1 | 3/2016 | Svensson et al. |
| 2016/0138248 A1 | 5/2016 | Conway et al. |
| 2016/0264387 A1 | 9/2016 | Yoon et al. |
| 2017/0001554 A1* | 1/2017 | Sørensen ............... B60Q 1/346 |
| 2017/0057798 A1 | 3/2017 | Dues et al. |
| 2017/0372188 A1* | 12/2017 | Simon ...................... G07C 9/38 |
| 2018/0016126 A1 | 1/2018 | Valfridsson et al. |
| 2018/0057049 A1 | 3/2018 | Stewart et al. |
| 2018/0089616 A1 | 3/2018 | Jacobus et al. |
| 2018/0118095 A1 | 5/2018 | Kunii et al. |
| 2018/0128932 A1 | 5/2018 | Frederick et al. |
| 2018/0151070 A1 | 5/2018 | Katou et al. |
| 2018/0155167 A1 | 6/2018 | Göpner |
| 2018/0170250 A1 | 6/2018 | Hanninen |
| 2018/0178342 A1 | 6/2018 | Russell |
| 2018/0209793 A1 | 7/2018 | Sakaguchi et al. |
| 2018/0265340 A1* | 9/2018 | Luminet .................... B60Q 1/52 |
| 2018/0330175 A1 | 11/2018 | Corcoran |
| 2018/0350098 A1 | 12/2018 | Siessegger et al. |
| 2019/0017828 A1 | 1/2019 | Harish et al. |
| 2019/0017837 A1 | 1/2019 | Harish et al. |
| 2019/0018037 A1 | 1/2019 | Harish et al. |
| 2019/0018425 A1 | 1/2019 | Harish et al. |
| 2019/0019254 A1 | 1/2019 | Harish et al. |
| 2019/0019255 A1 | 1/2019 | Harish et al. |
| 2019/0019351 A1 | 1/2019 | Harish et al. |
| 2019/0119084 A1 | 4/2019 | Pautz et al. |
| 2019/0138875 A1 | 5/2019 | Simon et al. |
| 2019/0161943 A1 | 5/2019 | Frank |

(56) References Cited

U.S. PATENT DOCUMENTS

| | | |
|---|---|---|
| 2019/0163188 A1 | 5/2019 | Walton et al. |
| 2019/0193629 A1 | 6/2019 | Zevenbergen et al. |
| 2019/0193937 A1 | 6/2019 | Sullivan et al. |
| 2019/0256083 A1 | 8/2019 | Kang et al. |
| 2019/0258266 A1 | 8/2019 | Kirk et al. |
| 2019/0270449 A1 | 9/2019 | Grabbe et al. |
| 2019/0315270 A1 | 10/2019 | Ly |
| 2019/0331761 A1 | 10/2019 | Wynn et al. |
| 2019/0361464 A1 | 11/2019 | Ahnell |
| 2019/0382252 A1 | 12/2019 | Meijer et al. |
| 2020/0018079 A1 | 1/2020 | Richards et al. |
| 2020/0024114 A1 | 1/2020 | Uchimura et al. |
| 2020/0031645 A1 | 1/2020 | Uchimura et al. |
| 2020/0073399 A1 | 3/2020 | Tateno et al. |

FOREIGN PATENT DOCUMENTS

| | | |
|---|---|---|
| CN | 102239455 A | 11/2011 |
| CN | 102549514 A | 7/2012 |
| CN | 102834345 A | 12/2012 |
| CN | 203402897 U | 1/2014 |
| CN | 106864359 A | 6/2017 |
| CN | 107161915 A | 9/2017 |
| CN | 107298409 A | 10/2017 |
| CN | 108751052 A | 11/2018 |
| CN | 109311650 A | 2/2019 |
| CN | 109533686 A | 3/2019 |
| DE | 3737660 A1 | 5/1989 |
| DE | 202008006639 U1 | 8/2008 |
| DE | 102007063226 A1 | 7/2009 |
| DE | 102009006175 A1 | 7/2010 |
| DE | 102010048144 A1 | 7/2011 |
| DE | 102010053793 A1 | 6/2012 |
| DE | 102012010876 A1 | 11/2012 |
| DE | 102012006536 A1 | 10/2013 |
| DE | 102013100191 A1 | 7/2014 |
| DE | 102016101404 A1 | 2/2017 |
| EP | 2261129 A1 | 12/2010 |
| EP | 2266885 A1 | 12/2010 |
| EP | 2123596 B1 | 10/2012 |
| EP | 2711880 A1 | 3/2014 |
| EP | 1834922 B1 | 5/2014 |
| EP | 2754584 A2 | 7/2014 |
| EP | 2468678 B1 | 3/2015 |
| EP | 2678748 B1 | 4/2015 |
| EP | 2708490 B1 | 4/2015 |
| EP | 2722687 B1 | 4/2015 |
| EP | 2910497 A1 | 8/2015 |
| EP | 2840556 B1 | 8/2016 |
| EP | 2840564 B1 | 8/2016 |
| EP | 3173294 A1 | 5/2017 |
| EP | 3118706 B1 | 3/2018 |
| EP | 3118707 B1 | 3/2018 |
| EP | 3118708 B1 | 3/2018 |
| EP | 3118153 B1 | 4/2018 |
| EP | 3312131 A1 | 4/2018 |
| EP | 3118152 B1 | 12/2018 |
| EP | 3434522 A1 | 1/2019 |
| EP | 3434640 A1 | 1/2019 |
| EP | 3454158 A1 | 3/2019 |
| EP | 3456681 A1 | 3/2019 |
| EP | 3469305 A1 | 4/2019 |
| EP | 3511287 A1 | 7/2019 |
| EP | 3514103 A1 | 7/2019 |
| EP | 3587339 A1 | 1/2020 |
| EP | 3620423 A1 | 3/2020 |
| EP | 2897017 B1 | 7/2020 |
| GB | 1421722 A | 1/1976 |
| GB | 2568752 A | 5/2019 |
| JP | 2017193928 A | 10/2017 |
| KR | 100907490 B1 | 7/2009 |
| KR | 101547564 B1 * | 8/2015 |
| KR | 20180135502 A | 12/2018 |
| WO | 199640533 A1 | 12/1996 |
| WO | 2004090830 A1 | 10/2004 |
| WO | 2010021515 A2 | 2/2010 |
| WO | 2015121818 A2 | 8/2015 |
| WO | 2016029246 A1 | 3/2016 |
| WO | 2017036750 A1 | 3/2017 |
| WO | 2018127681 A1 | 7/2018 |
| WO | 2018156652 A1 | 8/2018 |
| WO | 2018172165 A1 | 9/2018 |
| WO | 2018187341 A1 | 10/2018 |
| WO | 2019112427 A1 | 6/2019 |
| WO | 2019120856 A1 | 6/2019 |
| WO | 2019179768 A1 | 9/2019 |

OTHER PUBLICATIONS

"Red Zone Forklift Danger Zone Waning Light"; ForkLift Training Sys; Youtube Video; published Mar. 16, 2016; https://www.youtube.com/watch?v=c5tMCJ2YOYw.

Elokon; "ELOshield driver-assistance system"; retrieved on Apr. 22, 2021 from https://www.elokon.com/en-US/material-handling/eloshield-vehicle-pedestrian-proximity-detection.html.

Mallard Manufacturing; "Full & Split Roller Pallet Flow Rack"; retrieved on Apr. 22, 2021 from https://www.mallardmfg.com/full-split-roller-pallet-flow-rack/.

Cisco-Eagle; "Pedestrian Safety in Forklift Operations: An Introduction"; 2016; downloaded from https://ppsa.memberclicks.net/assets/ConferencePresentations/2016/Monday/1-%20alex%20gandall_ciscoeagle.pdf.

Sebastian Theos et al.; "Position Assistance System for a Materials Handling Vehicle"; Related U.S. Appl. No. 17/248,998; filed Feb. 17, 2021.

Sebastian Theos et al.; "Modify Vehicle Parameter Based on Vehicle Position Information"; Related U.S. Appl. No. 17/249,000; filed Feb. 17, 2021.

Zhang, Yufeng; Notice of Allowance; U.S. Appl. No. 17/248,998; Aug. 16, 2023; United States Patent and Trademark Office; Alexandria, Virginia.

Theos, Sebastian; Related U.S. Divisional U.S. Appl. No. 18/450,657; entitled "Modify Vehicle Parameter Based on Vehicle Position Information"; filed on Aug. 16, 2023; United States Patent and Trademark Office; Alexandria, Virginia.

Notice of Allowance dated May 30, 2023; U.S. Appl. No. 17/249,000; United States Patent and Trademark Office; Alexandria, Virgina.

Zhang, Yufeng; Final Office Action Dated May 9, 2023; U.S. Appl. No. 17/248,998, United States Patent Office; Alexandria, Virginia.

Restriction Requirement dated Dec. 8, 2022; U.S. Appl. No. 17/249,000; United States Patent and Trademark Office; Alexandria, Virginia.

Nguyen, Tan Quang; Office Action dated Jan. 31, 2023;U.S. Appl. No. 17/249,000; United States Patent and Trademark Office; Alexandria, Virginia.

International Preliminary Report on Patentability dated Aug. 23, 2022; International Application No. PCT/US2021/018284; The International Bureau of WIPO; Geneva, Switzerland.

International Preliminary Report on Patentability dated Aug. 23, 2022; International Application No. PCT/US2021/018291; The International Bureau of WIPO; Geneva, Switzerland.

International Preliminary Report on Patentability dated Aug. 23, 2022; International Application No. PCT/US2021/018285; The International Bureau of WIPO; Geneva, Switzerland.

Tian, Shaoxu; First Office Action dated May 29, 2023; Chinese Application No. 202180008054.0; China National Intellectual Property Administration; Beijing, China.

Tian, Shaoxu; First Office Action dated May 30, 2023; Chinese Application No. 202180007939.9; China National Intellectual Property Administration; Beijing, China.

Stamatia Epifanis; International Search Report and Written Opinion; International Application No. PCT/US2021/018284; Jun. 7, 2021; Rijswijk, Netherlands.

Stamatia Epifanis; International Search Report and Written Opinion; International Application No. PCT/US2021/018291; Jun. 10, 2021; Rijswijk, Netherlands.

Ana Rodriguez; International Search Report and Written Opinion; International Application No. PCT/US2021/018285; Jun. 29, 2021; Rijswijk, Netherlands.

(56) References Cited

OTHER PUBLICATIONS

Office Action dated Dec. 20, 2022; U.S. Appl. No. 17/248,998; United States Patent and Trademark Office; Alexandria, Virginia.
Lau, Albert; Office Action dated Sep. 18, 2023; Canadian Application No. 3,163,133; CIPO; Quebec, Canada.
Breton, Eric E.; Office Action dated Oct. 16, 2023; Canadian Application No. 3,163,146; CIPO; Quebec, Canada.
Bandaranayake, Sajith; Office Action dated Oct. 6, 2023; Canadian Application No. 3,163,140; CIPO; Quebec, Canada.
Tian, Shaoxu; Second Chinese Office Action dated Dec. 28, 2023; Chinese Application No. 202180008054.0; CNIPA; Beijing, China.
Tian, Shaoxu; Second Office Action dated Dec. 27, 2023; Chinese Application No. 202180007939.9; CNIPA; Beijing, China.
Theos, Sebastian; Related Contiuation U.S. Appl. No. 18/820,593 entitled "Modify Vehicle Parameter Based on Vehicle Position Information"; filed on Aug. 30, 2024; United States Patent and Trademark Office; Alexandria, Virginia.
Tian, Shaoxiao; Notice of Grant dated Apr. 29, 2024; Chinese Application No. 202180007939.9; CNIPA; Beijing, China.
Nguyen, Tan Quang; Notice of Allowance and Fees Due dated Jul. 2, 2024; Divisional U.S. Appl. No. 18/450,657; United States Patent and Trademark Office; Alexandria, Virginia.
Breton, Eric E.; Canadian Office Action dated Aug. 19, 2024; Canadian Application No. 3,163,146; Canadian Intellectual Property Office; Quebec, Canada.
Tian Shaoxiao; Notice of Grant of Invention Patent Right dated Jul. 24, 2024; Chinese Patent Application No. 202180008054.0; China National Intellectual Property Administration; Beijing, China.
Bandaranayake, Sajith; Canadian Office Action dated Sep. 9, 2024; Canadian Application No. 3,163,140; Canadian Intellectual Property Office; Quebec, Canada.

\* cited by examiner

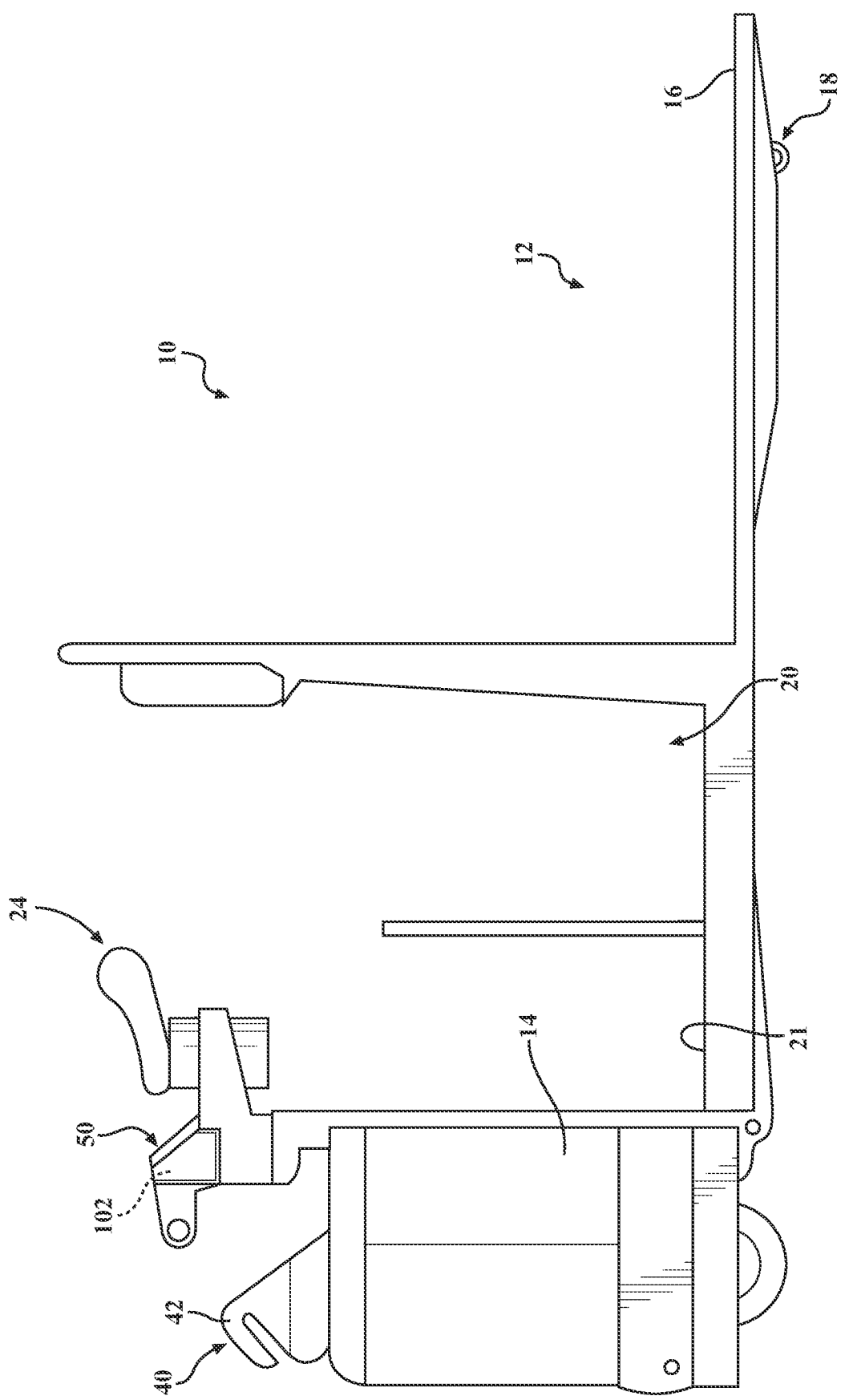

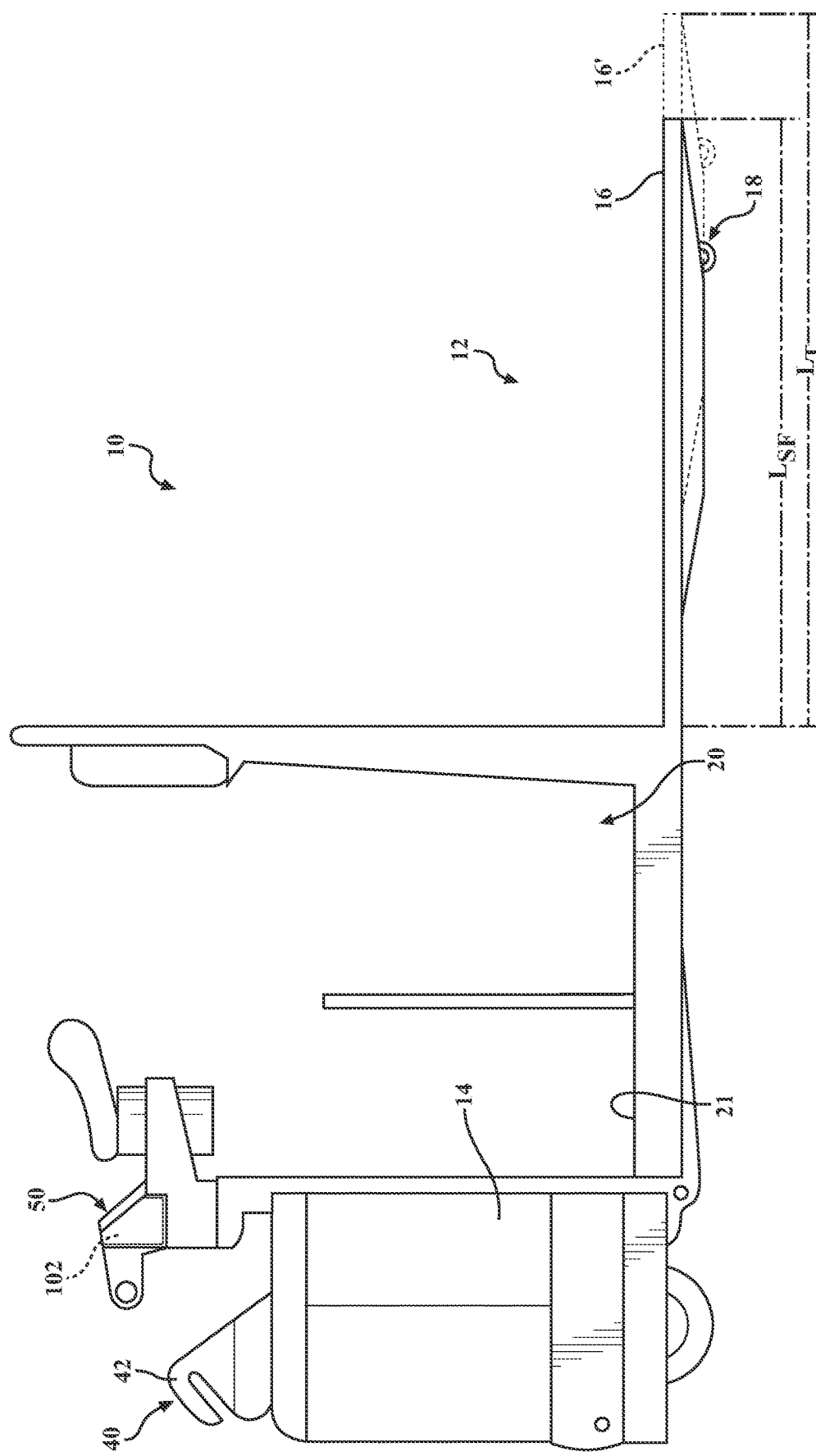

LIGHTING FLOOR ON SIDES OF MATERIAL HANDLING VEHICLE TO INDICATE LIMITED OR NON-LIMITED AREA

CROSS REFERENCE TO RELATED APPLICATION

This application claims the benefit of U.S. Provisional Patent Application Ser. No. 62/979,916, filed Feb. 21, 2020, entitled "REMOTELY CONTROLLED MATERIALS HANDLING VEHICLE," the entire disclosure of which is hereby incorporated by reference herein.

TECHNICAL FIELD

The present embodiments relate to a materials handling vehicle having a positioning assistance system that provides assistance to an operator that is driving the vehicle.

BACKGROUND

Known materials handling vehicles include a power unit, a mast assembly, and a platform assembly that includes a fork carriage assembly coupled to the mast assembly for vertical movement relative to the power unit.

SUMMARY

In accordance with a first aspect of the disclosure, a system is provided comprising: a materials handling vehicle comprising one or more sensing devices for determining a first distance from a left side of the vehicle to a first boundary object and a second distance from a right side of the vehicle to a second boundary object and a controller coupled to the one or more sensing devices; and a light source device coupled to the controller. The light source device may be controlled by the controller to designate a first area to the left side of the vehicle as either a limited operation area or a non-limited operation area and to designate a second area to the right side of the vehicle as either a limited operation area or a non-limited operation area. The limited operation area corresponds to an area where the first or the second distance is less than a predetermined distance and the non-limited operation area corresponds to an area where the first or the second distance is greater than or equal to the predetermined distance. When one of the first or the second distance is less than the predetermined distance, the light source device may designate the corresponding first or second area as a limited operation area in a first manner that can be observed by a person in the vicinity of the vehicle, and when concurrently the other of the first or the second distance is greater than or equal to the predetermined distance, the light source device may designate the corresponding first or second area as a non-limited operation area in a second manner that can be observed by a person in the vicinity of the vehicle.

The light source device may designate the first or second area as either a limited operation area or a non-limited operation area with one or more light sources.

The one or more light sources may illuminate at least a portion of a floor within the first area and illuminate at least a portion of the floor within the second area.

The vehicle may comprise a load handling assembly and a power unit including an operator station, and wherein the one or more light sources illuminate at least a portion of the floor between: the load handling assembly and the first boundary object, the load handling assembly and the second boundary object, the power unit and the first boundary object, and the power unit and the second boundary object.

The one or more light sources may be located on the vehicle.

The light source device may only designate the first or the second area as either a limited operation area or a non-limited operation area when the vehicle is located in an aisle.

The first and/or the second boundary object may be a wall or storage structure.

The predetermined distance may comprise a first predetermined distance, and when the first or the second distance is greater than or equal to the first predetermined distance but less than a second predetermined distance, the light source device may designate the corresponding first or second area in a third manner that can be observed by an operator, the third manner being different than the first and the second manner.

The system may further comprise a sensing system that detects that an operator has exited an operator station of the vehicle and whether the operator exited the operator station from a first exit on the left side of the vehicle or from a second exit on the right side of the vehicle; wherein if the left or the right side of the vehicle to which the operator exited the operator station is designated as a limited operation area, the controller may modify at least one function of the vehicle.

The at least one function of the vehicle that may be modified comprises at least one of traction control, operation of a lift carriage of a load handling assembly of the vehicle or remote control operation of the vehicle.

In accordance with a second aspect of the disclosure, a method is provided for controlling a light source device associated with a materials handling vehicle, wherein the materials handling vehicle comprises one or more sensing devices, the method comprising: sensing via the one or more sensing devices a first distance from a left side of the vehicle to a first boundary object and a second distance from a right side of the vehicle to a second boundary object; controlling the light source device to designate a first area to the left side of the vehicle as either a limited operation area or a non-limited operation area and to designate a second area to the right side of the vehicle as either a limited operation area or a non-limited operation area, the limited operation area corresponding to an area where the first or the second distance is less than a predetermined distance and the non-limited operation area corresponding to an area where the first or the second distance is greater than or equal to the predetermined distance; designating via the light source device, when one of the first or the second distance is less than the predetermined distance, the corresponding first or second area as a limited operation area in a first manner that can be observed by a person in the vicinity of the vehicle; and concurrently designating via the light source device, when concurrently, with the one distance being less that the predetermined distance, the other of the first or the second distance is greater than or equal to the predetermined distance, the corresponding first or second area as a non-limited operation area in a second manner that can be observed by a person in the vicinity of the vehicle.

The light source device may comprise one or more light sources.

The method may further comprise illuminating via the one or more light sources at least a portion of the floor within the first area and illuminating at least a portion of the floor within the second area.

The vehicle may further comprise a load handling assembly and a power unit including an operator station, and wherein the one or more light sources may illuminate at least a portion of the floor between: the load handling assembly and the first boundary object, the load handling assembly and the second boundary object, the power unit and the first boundary object, and the power unit and the second boundary object.

The one or more light sources may be located on the vehicle.

The light source device may only designate the first or the second area as either a limited operation area or a non-limited operation area when the vehicle is located in an aisle.

The first and/or the second boundary object may be a wall or storage structure.

The predetermined distance may comprise a first predetermined distance, and when the first or the second distance is greater than or equal to the first predetermined distance but less than a second predetermined distance, the light source device may designate the corresponding first or second area in a third manner that can be observed by an operator, the third manner being different than the first and the second manner.

The system may further comprise a sensing system that detects that an operator has exited an operator station of the vehicle and whether the operator exited the operator station from a first exit on the left side of the vehicle or from a second exit on the right side of the vehicle; wherein if the left or right side of the vehicle to which the operator exited the operator station is designated as a limited operation area, a controller may modify at least one function of the vehicle.

The at least one function of the vehicle that is modified may comprise at least one of traction control, operation of a lift carriage of a load handling assembly of the vehicle or remote control operation of the vehicle.

The at least one function that has been modified may be returned to its initial state when the operator returns to the operator station.

BRIEF DESCRIPTION OF THE SEVERAL VIEWS OF THE DRAWINGS

FIG. 2A is a side view of another materials handling vehicle according to one or more embodiments shown and described herein;

FIG. 7 is a side view of another materials handling vehicle according to one or more embodiments shown and described herein;

DETAILED DESCRIPTION

The following text sets forth a broad description of numerous different embodiments of the present disclosure. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. It should be understood that multiple combinations of the embodiments described and shown are contemplated and that a particular focus on one embodiment does not preclude its inclusion in a combination of other described embodiments. Numerous alternative embodiments could also be implemented, using either current technology or technology developed after the filing date of this patent, which would still fall within the scope of the claims. All publications and patents cited herein are incorporated herein by reference.

Low Level Order Picking Truck

Figure 1:
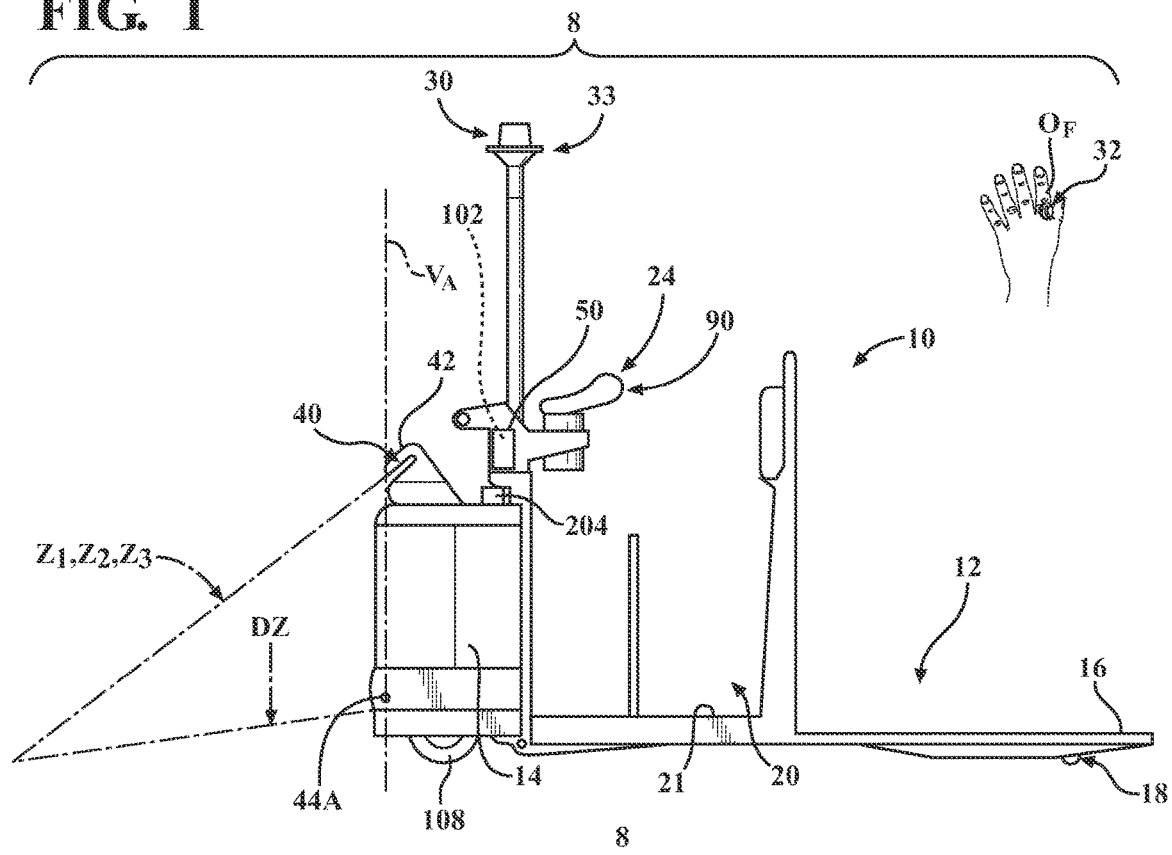
FIGS. 1 and 2 are side and top views, respectively, of a materials handling vehicle according to one or more embodiments shown and described herein.
Figure 2:
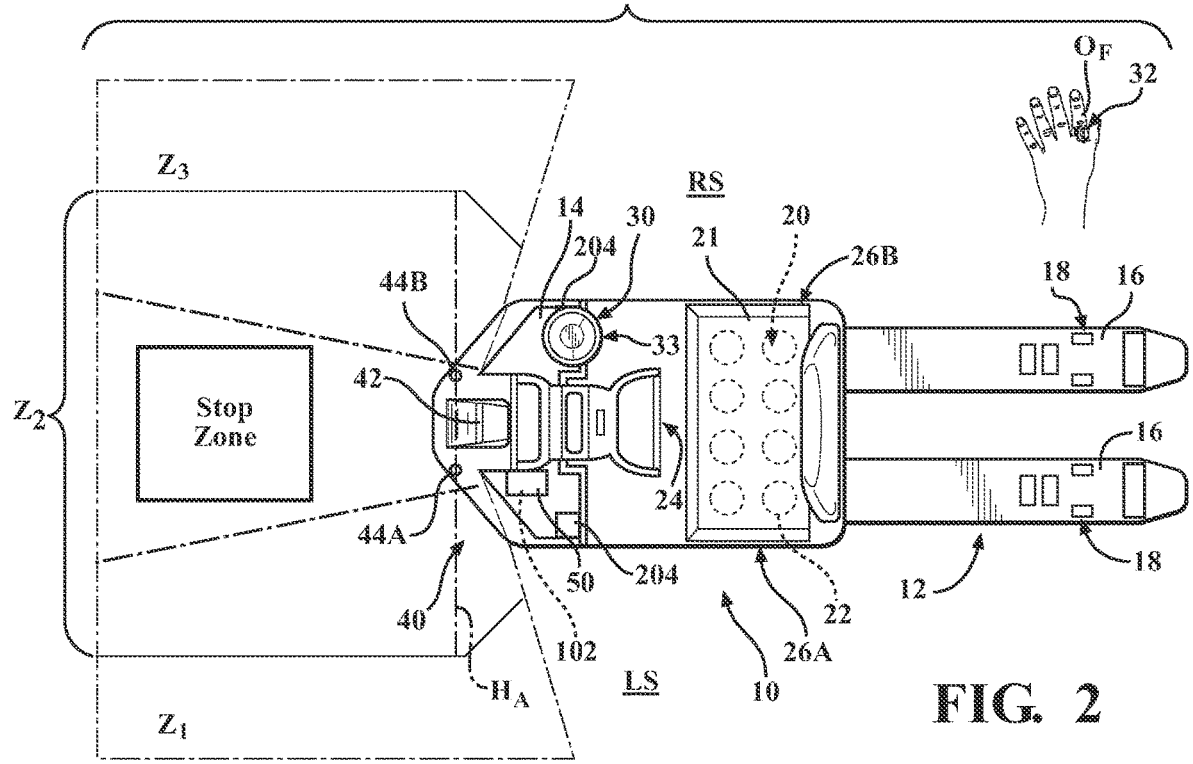

Referring now to the drawings, and particularly to FIGS. 1 and 2, a materials handling vehicle 10, which is illustrated as a low level order picking truck, includes a load handling assembly 12 that is coupled to and extends from a power unit 14. The vehicle 10 forms part of a system 8, which system 8 will be more fully described below. The load handling assembly 12 includes a pair of forks 16, each fork 16 having a load supporting wheel assembly 18. The load handling assembly 12 may include other load handling features in addition to, or in lieu of the illustrated arrangement of the forks 16, such as a load backrest, scissors-type elevating forks, outriggers or separate height adjustable forks, as a few examples. Still further, the load handling assembly 12 may include load handling features such as a mast, a load platform, a collection cage or other support structure carried by the forks 16 or otherwise provided for handling a load supported and carried by the vehicle 10. While the present disclosure is made with reference to the illustrated vehicle 10, it will be apparent to those of skill in the art that the vehicle 10 may comprise a variety of other industrial vehicles, such as a forklift truck, a reach truck, etc., and that the following description with reference to the Figures should not be limited to an order picking truck unless otherwise specified. Additionally, the vehicle 10 may be implemented in other formats, styles and features, including a vehicle 10 that includes a load handling assembly in the form of a hook, clamp, trailer, such as a tugger vehicle, etc.

The illustrated power unit 14 comprises a step-through operator station 20 dividing a first end section of the power unit 14 (opposite the forks 16) from a second end section (proximate the forks 16). The operator station 20 includes a platform 21 upon which an operator may stand to drive the vehicle 10 and/or to provide a position from which the operator may operate various included features of the vehicle 10. The operator manually controls traveling functions of the vehicle 10 using operator controls 24 provided in the operator station 20.

The power unit 14 further comprises at least one steered wheel 108. The truck 10 comprises a steer-by-wire system for effecting angular movement of the steered wheel 108. The steer-by-wire system 80 comprises a control handle 90 forming part of the operator controls 24, a steer motor 114 and the steered wheel 108, see FIGS. 1 and 3. The term "control handle" is intended to encompass the control handle 90 illustrated in FIGS. 1 and 2 and like control handles including steering tillers and steering wheels. The control handle 90 may be capable of being rotated by an operator approximately +/−60 degrees from a centered position, wherein the centered position corresponds to the steered wheel 108 being located in a straight-ahead position. A control handle position sensor 100A, shown in FIG. 3, senses the angular position of the control handle 90 and may comprise a potentiometer. An operator may rotate the control handle 90 within the angular range of approximately +/−60 degrees in the illustrated embodiment to control movement of the steered wheel 108, which wheel 108 may be capable of rotating approximately +/−90 degrees from a centered position in the illustrated embodiment. As the control handle 90 is rotated by the operator, the control handle position sensor 100A senses that rotation, i.e., magnitude and direction, and generates a steer control signal corresponding to a desired angular position of the steered wheel 108 to the controller 103, see FIG. 3, which may be communicably coupled to a steer controller 112. The controller 103 generates a corresponding steer actuation signal to the steer controller 112, which is coupled to the steer motor 114, to cause the steer motor 114 to move the steered wheel 108 to the desired angular position. The control handle 90 and the control handle position sensor 100A define a steering device.

Presence sensors 22 (see FIG. 2) may be provided to detect the presence of an operator on the vehicle 10. For example, presence sensors 22 may be located on, above or under the platform 21, or otherwise provided about the operator station 20. In the exemplary vehicle 10 of FIG. 2, the presence sensors 22 are shown in dashed lines indicating that they are positioned underneath the platform 21. Under this arrangement, the presence sensors 22 may comprise load sensors, switches, etc. As an alternative, the presence sensors 22 may be implemented above the platform 21, such as by using ultrasonic, capacitive or other suitable sensing technology. The utilization of presence sensors 22 will be described in greater detail herein.

The vehicle 10 illustrated in FIGS. 1 and 2 includes first and second exits 26A, 26B, from which the operator can exit the operator station 20. The first exit 26A is located at a left side LS of the vehicle 10, and the second exit 26B is located at a right side RS of the vehicle 10, as shown in FIG. 2.

According to one embodiment shown in FIG. 2, the vehicle 10 may include a pole that extends vertically from the power unit 14 and includes an antenna 30 that is provided for receiving control signals from a corresponding wireless remote control device 32. The pole may include a light 33 at the top, as shown in FIGS. 1 and 2. According to another embodiment as shown in FIG. 2A, the antenna may be located within other vehicle components, such that the control signals from the remote control device 32 are received elsewhere on the vehicle 10, as will be discussed below.

The remote control device 32 is manually operable by an operator, e.g., by pressing a button or other control, to cause the remote control device 32 to wirelessly transmit at least a first type signal designating a travel request to a vehicle 10 that is paired to the remote control device 32. The travel request is a command that requests the vehicle 10 to travel, as will be described in greater detail herein. Although the remote control device 32 is illustrated in FIGS. 1 and 2 as a finger-mounted structure, numerous implementations of the remote control device 32 may be implemented, including for example, a glove structure, a lanyard or sash mounted structure, etc. Additional details in connection with the remote control device 32 will be discussed in detail below.

The vehicle 10 also comprises one or more contactless obstacle sensors 40, which are provided about the vehicle 10, e.g., towards the first end section of the power unit 14 as shown in FIGS. 1 and 2. The obstacle sensors 40 are operable to define at least one detection zone. For example, at least one detection zone may define an area at least partially in front of a forward traveling direction of the vehicle 10 when the vehicle 10 is traveling in response to a wirelessly received travel request from the remote control device 32, as will also be described in greater detail herein.

The obstacle sensors 40 may comprise any suitable proximity detection technology, such as ultrasonic sensors, image capture devices, infrared sensors, laser scanner sensors, etc., which are capable of detecting the presence of objects/obstacles or are capable of generating signals that can be analyzed to detect the presence of objects/obstacles within the predefined detection zone(s). In the exemplary embodiment illustrated in FIGS. 1 and 2, the vehicle 10 includes a first obstacle detector 42 and a pair of second obstacle detectors 44A and 44B mounted to the power unit 14. The first obstacle detector 42 is spaced apart from the second obstacle detectors 44A and 44B along a vertical axis VA of the vehicle 10 defining a vertical direction, i.e., the second obstacle detectors 44A and 44B are located below (closer to the ground than) the first obstacle detector 42, see FIG. 1. The second obstacle detectors 44A and 44B are spaced apart from each other along a horizontal axis HA of the vehicle 10 defining a horizontal direction, see FIG. 2.

The first obstacle detector 42 may comprise a sweeping or scanning laser sensor capable of detecting objects, for example, in first, second, and third zones $Z_1$, $Z_2$, $Z_3$ (also referred to herein as scan zones or detection zones), which first, second, and third zones $Z_1$, $Z_2$, $Z_3$ may comprise planar zones, see FIGS. 1 and 2. The second zone $Z_2$ may comprise a "stop zone", wherein the vehicle 10 stops if it is traveling under control by the remote control device 32 and an object is detected in the stop zone, and the first and third zones $Z_1$ and $Z_3$ may comprise left and right "steer bumper zones", wherein the vehicle 10 may be steered so as to attempt to avoid contact with an object if it is traveling under control by the remote control device 32 and an object is detected in the steer bumper zone. It is noted that the first obstacle detector 42 may be capable of detecting objects in additional or fewer zones than the three zones $Z_1$, $Z_2$, $Z_3$ illustrated.

The second obstacle detectors 44A and 44B may comprise point laser sensors that are capable of detecting objects between one or more of the zones $Z_1$, $Z_2$, $Z_3$ of the first obstacle detector 42 and the vehicle 10, i.e., underneath one or more of the zones $Z_1$, $Z_2$, $Z_3$, as illustrated in FIG. 1, and/or past the zones $Z_1$, $Z_2$, $Z_3$, and are preferably capable of at least detecting objects underneath the second zone $Z_2$. The second obstacle detectors 44A and 44B are thus capable of detecting objects located in a non-detect zone DZ of the first obstacle detector 42, see FIG. 1, i.e., which non-detect zone DZ is defined as an area below the zones $Z_1$, $Z_2$, $Z_3$ and thus not sensed by the first obstacle detector 42. Hence, the first obstacle detector 42 functions to detect objects located along a path of travel of the power unit 14 beyond the non-detect zone DZ, while the second obstacle detectors 44A and 44B function to sense objects along the path of travel of the power unit 14 in the non-detect zone DZ, which is located just in front of the vehicle 10, as shown in FIG. 1.

Additional sensor configurations and/or detection zones may be used.

Control Systems

Figure 3:
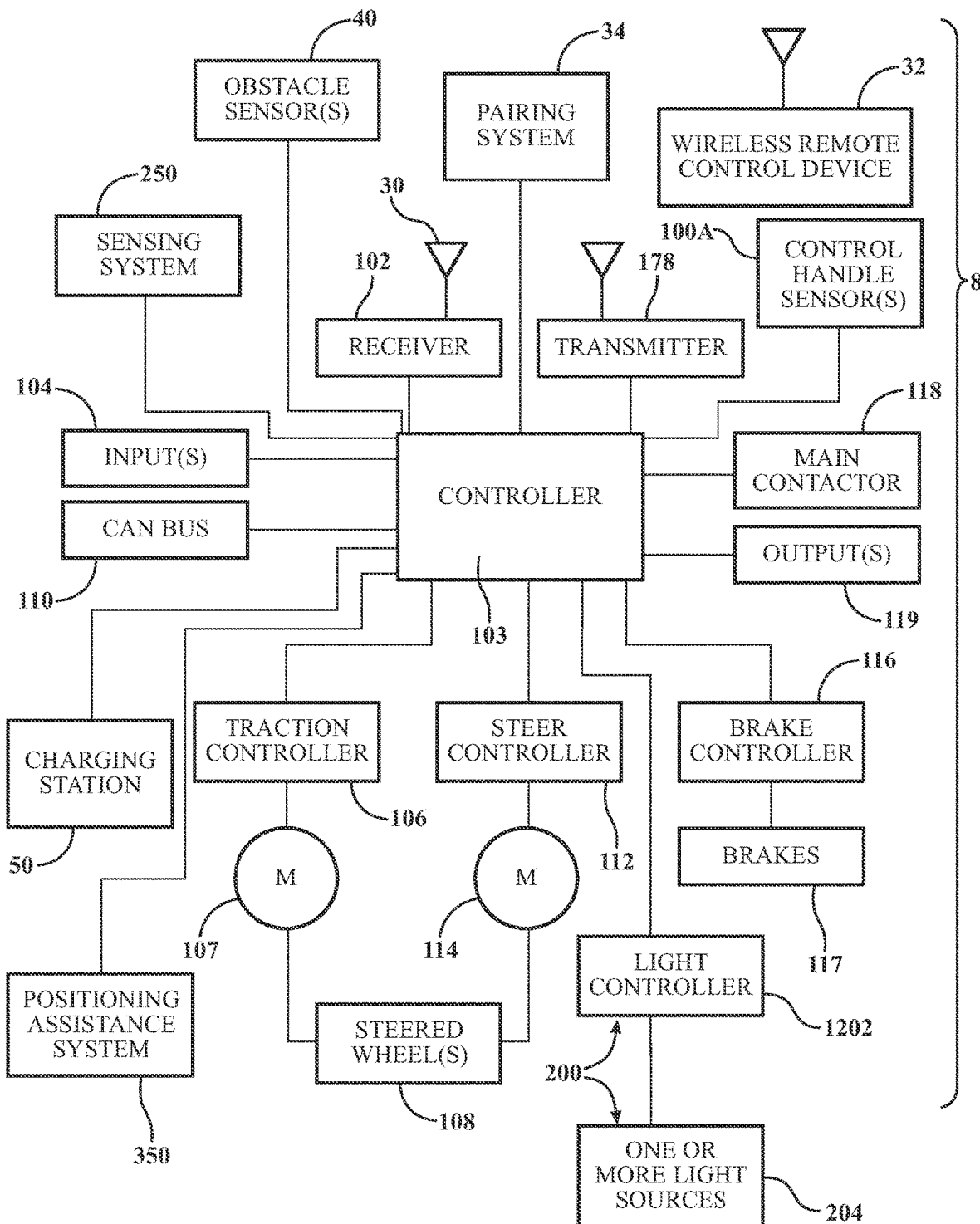
FIG. 3 is a schematic diagram of several components of a materials handling vehicle capable of remote wireless operation according to one or more embodiments shown and described herein.

Referring to FIG. 3, a block diagram illustrates a control arrangement for integrating remote control commands with the vehicle 10. A receiver 102, which may be a Bluetooth Low Energy (BLE) radio, for example, is provided for receiving commands issued by the remote control device 32. The receiver 102 passes the received control signals to the controller 103, which implements the appropriate response to the received commands and may thus also be referred to herein as a master controller. In this regard, the controller 103 is implemented in hardware and may also execute software (including firmware, resident software, microcode, etc.). Furthermore, embodiments may take the form of a computer program product embodied in one or more computer readable medium(s) having computer readable program code embodied thereon. For example, the vehicle 10 may include memory that stores the computer program product, which, when implemented by a processor of the controller 103, implements steer correction as described more fully herein.

Thus, the controller 103 may define, at least in part, a data processing system suitable for storing and/or executing program code and may include at least one processor coupled directly or indirectly to memory elements, e.g., through a system bus or other suitable connection. The memory elements can include local memory employed during actual execution of the program code, memory that is integrated into a microcontroller or application specific integrated circuit (ASIC), a programmable gate array or other reconfigurable processing device, etc.

The response implemented by the controller 103 in response to wirelessly received commands, e.g., via a wireless transmitter 178 of the remote control device 32 (to be discussed below) and sent to the receiver 102 on the vehicle 10, may comprise one or more actions, or inaction, depending upon the logic that is being implemented. Positive actions may comprise controlling, adjusting or otherwise affecting one or more components of the vehicle 10. The controller 103 may also receive information from other inputs 104, e.g., from sources such as the presence sensors 22, the obstacle sensors 40, switches, load sensors, encoders and other devices/features available to the vehicle 10 to determine appropriate action in response to the received commands from the remote control device 32. The sensors 22, 40, etc. may be coupled to the controller 103 via the inputs 104 or via a suitable truck network, such as a control area network (CAN) bus 110.

In an exemplary arrangement, the remote control device 32 is operative to wirelessly transmit a control signal that represents a first type signal such as a travel command to the receiver 102 on the vehicle 10. The travel command is also referred to herein as a "travel signal", "travel request" or "go signal". The travel request is used to initiate a request to the vehicle 10 to travel, e.g., for as long as the travel signal is received by the receiver 102 and/or sent by the remote control device 32, by a predetermined amount, e.g., to cause the vehicle 10 to advance or jog in a first direction by a limited travel distance, or for a limited time. The first direction may be defined, for example, by movement of the vehicle 10 in a power unit 14 first, i.e., forks 16 to the back, direction. However, other directions of travel may alternatively be defined. Moreover, the vehicle 10 may be controlled to travel in a generally straight direction or along a previously determined heading. Correspondingly, the limited travel distance may be specified by an approximate travel distance, travel time or other measure.

Thus, a first type signal received by the receiver 102 is communicated to the controller 103. If the controller 103 determines that the travel signal is a valid travel signal and that the current vehicle conditions are appropriate, the controller 103 sends a signal to the appropriate control configuration of the vehicle 10 to advance and then stop the vehicle 10. Stopping the vehicle 10 may be implemented, for example, by either allowing the vehicle 10 to coast to a stop or by initiating a brake operation to cause the vehicle 10 to brake to a stop.

As an example, the controller 103 may be communicably coupled to a traction control system, illustrated as a traction motor controller 106 of the vehicle 10. The traction motor controller 106 is coupled to a traction motor 107 that drives the at least one steered wheel 108 of the vehicle 10. The controller 103 may communicate with the traction motor controller 106 so as to accelerate, decelerate, adjust and/or otherwise limit the speed of the vehicle 10 in response to receiving a travel request from the remote control device 32. As noted above, the controller 103 may also be communicably coupled to the steer controller 112, which is coupled to the steer motor 114 that steers at least one steered wheel 108 of the vehicle 10. In this regard, the vehicle 10 may be controlled by the controller 103 to travel an intended path or maintain an intended heading in response to receiving a travel request from the remote control device 32.

As yet another illustrative example, the controller 103 may be communicably coupled to a brake controller 116 that controls vehicle brakes 117 to decelerate, stop or otherwise control the speed of the vehicle 10 in response to receiving a travel request from the remote control device 32. Still further, the controller 103 may be communicably coupled to other vehicle features, such as main contactors 118, and/or other outputs 119 associated with the vehicle 10, where applicable, to implement desired actions in response to implementing remote travel functionality.

According to various embodiments, the controller 103 may communicate with the receiver 102 and with the traction motor controller 106 to operate the vehicle 10 under remote control in response to receiving travel commands from the associated remote control device 32. Moreover, the controller 103 may be configured to perform various actions if the vehicle 10 is traveling under remote control in response to a travel request and an obstacle is detected in one or more of the detection zone(s) $Z_1$, $Z_2$, $Z_3$. In this regard, when a travel signal is received by the controller 103 from the remote control device 32, any number of factors may be considered by the controller 103 to determine whether the received travel signal should be acted upon to initiate and/or sustain movement of the vehicle 10.

Correspondingly, if the vehicle 10 is moving in response to a command received by the remote control device 32, the controller 103 may dynamically alter, control, adjust or otherwise affect the remote control operation, e.g., by stopping the vehicle 10, changing the steer angle of the vehicle 10, or taking other actions. Thus, the particular vehicle features, the state/condition of one or more vehicle features, vehicle environment, etc., may influence the manner in which the controller 103 responds to travel requests from the remote control device 32.

The controller 103 may refuse to acknowledge a received travel request depending upon predetermined condition(s), e.g., that relate to environmental or operational factor(s). For example, the controller 103 may disregard an otherwise valid travel request based upon information obtained from one or more of the sensors 22, 40. As an illustration, according to various embodiments, the controller 103 may optionally consider factors such as whether an operator is on the vehicle 10 when determining whether to respond to a travel command from the remote control device 32. As noted above, the vehicle 10 may comprise at least one presence sensor 22 for detecting whether an operator is positioned on the vehicle 10. In this regard, the controller 103 may be further configured to respond to a travel request to operate the vehicle 10 under remote control when the presence sensor(s) 22 designate that no operator is on the vehicle 10. Thus, in this implementation, the vehicle 10 cannot be operated in response to wireless commands from the remote control device 32 unless the operator is physically off of the vehicle 10. Similarly, if the obstacle sensors 40 detect that an object, including the operator, is adjacent and/or proximate to the vehicle 10, the controller 103 may refuse to acknowledge a travel request from the remote control device 32. Thus, in an exemplary implementation, an operator must be located within a limited range of the vehicle 10, e.g., close enough to the vehicle 10 to be in wireless communication range (which may be limited to set a maximum distance of the operator from the vehicle 10). Other arrangements may alternatively be implemented.

Any other number of reasonable conditions, factors, parameters or other considerations may also/alternatively be implemented by the controller 103 to interpret and take action in response to received signals from the transmitter 178.

Upon acknowledgement of a travel request, the controller 103 interacts with the traction motor controller 106, e.g., directly or indirectly, e.g., via a bus such as the CAN bus 110 if utilized, to advance the vehicle 10. Depending upon the particular implementation, the controller 103 may interact with the traction motor controller 106 and optionally, the steer controller 112, to advance the vehicle 10 for as long as a travel control signal is received. Alternatively, the controller 103 may interact with the traction motor controller 106 and optionally, the steer controller 112, to advance the vehicle 10 for a period of time or for a predetermined distance in response to the detection and maintained actuation of a travel control on the remote control device 32. Still further, the controller 103 may be configured to "time out" and stop the travel of the vehicle 10 based upon a predetermined event, such as exceeding a predetermined time period or travel distance regardless of the detection of maintained actuation of a corresponding control on the remote control device 32.

The remote control device 32 may also be operative to transmit a second type signal, such as a "stop signal", designating that the vehicle 10 should brake and/or otherwise come to rest. The second type signal may also be implied, e.g., after implementing a "travel" command, e.g., after the vehicle 10 has traveled a predetermined distance, traveled for a predetermined time, etc., under remote control in response to the travel command. If the controller 103 determines that a wirelessly received signal is a stop signal, the controller 103 sends a signal to the traction motor controller 106, the brake controller 116 and/or other truck component to bring the vehicle 10 to a rest. As an alternative to a stop signal, the second type signal may comprise a "coast signal" or a "controlled deceleration signal" designating that the vehicle 10 should coast, eventually slowing to rest.

The time that it takes to bring the vehicle 10 to a complete rest may vary, depending for example, upon the intended application, the environmental conditions, the capabilities of the particular vehicle 10, the load on the vehicle 10 and other similar factors. For example, after completing an appropriate jog movement, it may be desirable to allow the vehicle 10 to "coast" some distance before coming to rest so that the vehicle 10 stops slowly. This may be achieved by utilizing regenerative braking to slow the vehicle 10 to a stop. Alternatively, a braking operation may be applied after a predetermined delay time to allow a predetermined range of additional travel to the vehicle 10 after the initiation of the stop operation. It may also be desirable to bring the vehicle 10 to a relatively quicker stop, e.g., if an object is detected in the travel path of the vehicle 10 or if an immediate stop is desired after a successful jog operation. For example, the controller 103 may apply predetermined torque to the braking operation. Under such conditions, the controller 103 may instruct the brake controller 116 to apply the brakes 117 to stop the vehicle 10.

A pairing system 34 can utilize, for example, a close range system to wirelessly communicate with a compatible close range system on the wireless remote control device 32. Using the pairing system 34, a vehicle 10 and wireless remote control device 32 can be "paired" such that a vehicle 10 will transmit and receive messages from only its paired wireless remote control device 32. The pairing system 34 includes components that physically implement the communication method (e.g., Bluetooth, NFC, BLE, Wi-Fi, etc.) used to send messages and includes components that programmatically exchange information in an agreed upon protocol to establish and maintain a pairing. Thus, the pairing system 34 includes a device that can execute programmable instructions to implement a predetermined algorithm and protocol to accomplish pairing operations.

Figure 4:
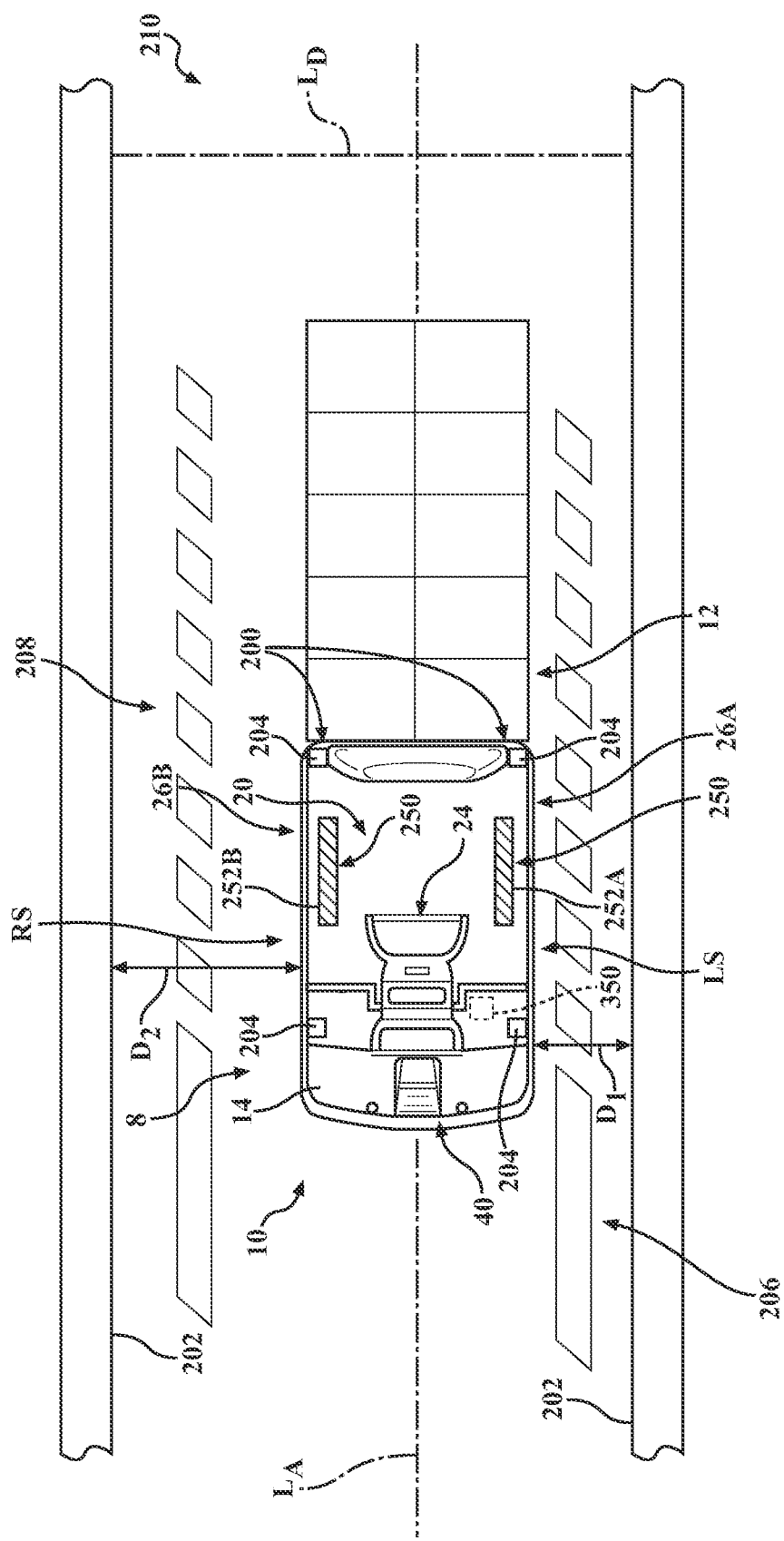
FIG. 4 is a schematic illustration of a materials handling vehicle according to one or more embodiments shown and described herein.

With reference now to FIGS. 1, 2, and 4, FIG. 4 schematically illustrates a slightly different embodiment of the vehicle 10, which may generally include the same components of the vehicle 10 of FIGS. 1, 2, and 2A. The system 8 according to an embodiment further comprises a light source device 200 for designating an area to the left side LS or right side RS (see FIGS. 2 and 4) of the vehicle 10 as a limited operation area and/or an area to the left side LS or right side RS of the vehicle 10 as a non-limited operation area. As used herein, the phrase "limited operation area" may correspond to an area where a distance $D_1$ or $D_2$ between the left or right side LS, RS of the vehicle 10 and a boundary object 202 adjacent to which the vehicle 10 is located, such as a wall, a support post, or a storage structure such as a rack, shelf, pallet, and the like, is less than a predetermined distance, and the phrase "non-limited operation area" may correspond to an area where the distance $D_1$ or $D_2$ is greater than or equal to the predetermined distance. Distance $D_1$ may be referred to as a first distance, distance $D_2$ may be referred to as a second distance, an area to the left side LS of the vehicle may be referred to as a first area and an area to the right side RS of the vehicle may be referred to as a second area. The "predetermined distance" may be set to a value such that when the distance $D_1$ or $D_2$ is less than the predetermined distance, the area corresponding to that distance $D_1$ or $D_2$ may be an area not sufficiently large enough to receive an operator or person while also maintaining a minimum clearance distance (which clearance distance may be defined by the vehicle owner or vehicle manufacturer) between the operator or person and the boundary object 202, and when the distance $D_1$ or $D_2$ is greater than or equal to the predetermined distance, the area corresponding to that distance $D_1$ or $D_2$ may be an area of sufficient size to receive an operator or person and maintain a minimum clearance distance between the operator or person and the boundary object 202. The distances $D_1$ and $D_2$ are measured between the vehicle 10 and the object 202, e.g., between the power unit 14 of the vehicle 10 and the object 202, or between the load handling assembly 12 and the object 202, in a lateral direction $L_D$, which is perpendicular to a longitudinal axis LA of the vehicle 10, as shown in FIG. 4. As noted above, the controller 103 may receive information from the obstacle sensors 40. The controller 103 may also be coupled to the light source device 200 to control operation of the device 200. The distances $D_1$ and $D_2$ may be determined by the controller 103, for example, using sensor information or data obtained from one or more sensing devices coupled to the controller 103, such as the obstacle sensor(s) 40 including the first obstacle detector 42 or other suitable sensors, or by using positional data of the vehicle 10 in relation to known positional data of the object 202. As noted above, the first obstacle detector 42 may comprise a scanning laser sensor, which scanning sensor may sense or measure distances in X and Y directions and, hence, may measure the distances $D_1$ and $D_2$ between the vehicle 10 and the object(s) 202.

The light source device 200 may comprise a light controller 1202 and one or more light sources 204 coupled to the light controller 1202, wherein the one or more light sources 204 may be located on the vehicle 10 and may comprise visible lasers, light bars, projectors, etc., which light sources 204 may project visible indicia on the floor adjacent to the vehicle 10 on the left side LS and/or right side RS, and also optionally in front of and/or behind the vehicle 10. See FIG. 4C for exemplary locations of the light sources 204. The light controller 1202 may be coupled to the controller 103, which controller 103 controls operation of the one or more light sources 204 via the light controller 1202. It is contemplated that in addition to the light source locations shown in FIG. 4C, in some embodiments, the light sources 204 could be incorporated into the vehicle 10 structure such that they are flush with the body lines of the vehicle 10. In some embodiments, the light sources 204 may be coupled to the power unit 14, forks 16, skirt, etc. and positioned such that they will not be knocked out of alignment should an object contact the light source 204. When the distance $D_1$ or $D_2$ between the vehicle 10 and the object 202 is less than the predetermined distance, the controller 103 activates or controls via the light controller 1202 the one or more light sources 204 such that the one or more light sources 204 designate the area between the vehicle 10 and the object 202 as a limited operation area in a manner that can be observed by an operator or a person in the vicinity of the vehicle, e.g., by illuminating at least a portion of the floor adjacent to the vehicle 10 corresponding to the limited operation area with visible indicia. When the distance $D_1$ or $D_2$ between the vehicle 10 and the object 202 is greater than or equal to the predetermined distance, the controller 103 controls via the light controller 1202 the one or more light sources 204 such that they do not designate the area between the vehicle 10 and the object 202 as a limited operation area, wherein the controller 103 may activate or control the one or more light sources 204 via the light controller 1202 such that they optionally designate the area between the vehicle 10 and the object 202 as a non-limited operation area in a manner that can be observed by the operator or a person in the vicinity of the vehicle 10, e.g., by illuminating at least a portion of the floor adjacent to the vehicle 10 corresponding to the non-limited operation area with visible indicia that is distinguishable from the indicia used to designate a limited operation area.

When both of the distances $D_1$ and $D_2$ are concurrently greater than or equal to the predetermined distance, the controller 103 may activate the one or more light sources 204 such that they concurrently designate first and second areas on opposed sides of the vehicle 10 as non-limited operation areas. Also, when both of the distances $D_1$ and $D_2$ are concurrently less than the predetermined distance, the controller 103 may activate the one or more light sources 204 such that they concurrently designate the first and second areas on opposed sides of the vehicle 10 as limited operation areas. Additionally, when one of the distances $D_1$ or $D_2$ is greater than or equal to the predetermined distance, and the other of the distances $D_1$ or $D_2$ is concurrently less than the predetermined distance, the controller 103 may activate the one or more light sources 204 via the light controller 1202 such that the one or more light sources 204 concurrently designate one of the first and second areas as a limited operation area and the other of the first and second areas as a non-limited operation area.

According to an embodiment, the one or more light sources 204 may designate a limited operation area using a first indicia 206 (see FIG. 4), such as a first light pattern, which may have a first light color, and a non-limited operation area using a second indicia 208 (see FIG. 4) distinguishable from the first indicia 206, such as a second light pattern, which may have a second light color different from the first light color. As another optional feature, the one or more light sources 204 may designate that the vehicle 10 is approaching a limited operation area using a third indicia 209 that is distinguishable from the first indicia 206 and the second indicia 208, such as a third light pattern, which may have a third light color. The controller 103 may cause the third indicia 209 to be illuminated by the one or more light sources 204 when the distance between the vehicle 10 and the object 202 is greater than or equal to the predetermined distance, i.e., a first predetermined distance DA, but less than a second predetermined distance DB, see FIG. 4D.

Hence, the second and third indicia may be illuminated concurrently when the distance between the vehicle 10 and the object 202 is greater than the first predetermined distance but less than the second predetermined distance. Separate light sources 205, coupled to the light controller 1202, may be provided for generating the third indicia 209.

The one or more light sources 204 and separate light sources 205 may be located anywhere on the vehicle 10, such as on the power unit 14, for example, and are preferably located where they can illuminate at least a portion of the floor between the load handling assembly 12 and the object 202 and between the power unit/operator station 14/20 and the object 202.

In embodiments, the controller 103 will only actuate the one or more light sources 204 and separate light sources 205 to illuminate the applicable indicia if the vehicle 10 is determined to be in an aisle 210. In such an embodiment, the light sources 204 and separate light sources 205 will not be activated while the vehicle 10 is in a location other than in an aisle 210. The vehicle 10 may be determined to be in an aisle 210, for example, by the controller 103 using sensor data from the obstacle sensor(s) 40, by a warehouse management system (WMS) that communicates with the vehicle 10, and/or using positional data of the vehicle 10, etc.

This embodiment provides an operator or other person in the vicinity of the vehicle 10 with a suggestion as to where they might not want to walk (limited operation area), in addition to a suggestion where they may want to walk (non-limited operation area). When the device 200 is located on the vehicle 10, the device 200 moves with the vehicle 10, which is beneficial in that there will be no limited operation area when the vehicle 10 is not in the vicinity. In other words, an area may only become a limited operation area when a vehicle 10 is present and is located close to the object 202, e.g., the wall or rack.

Figure 4A:
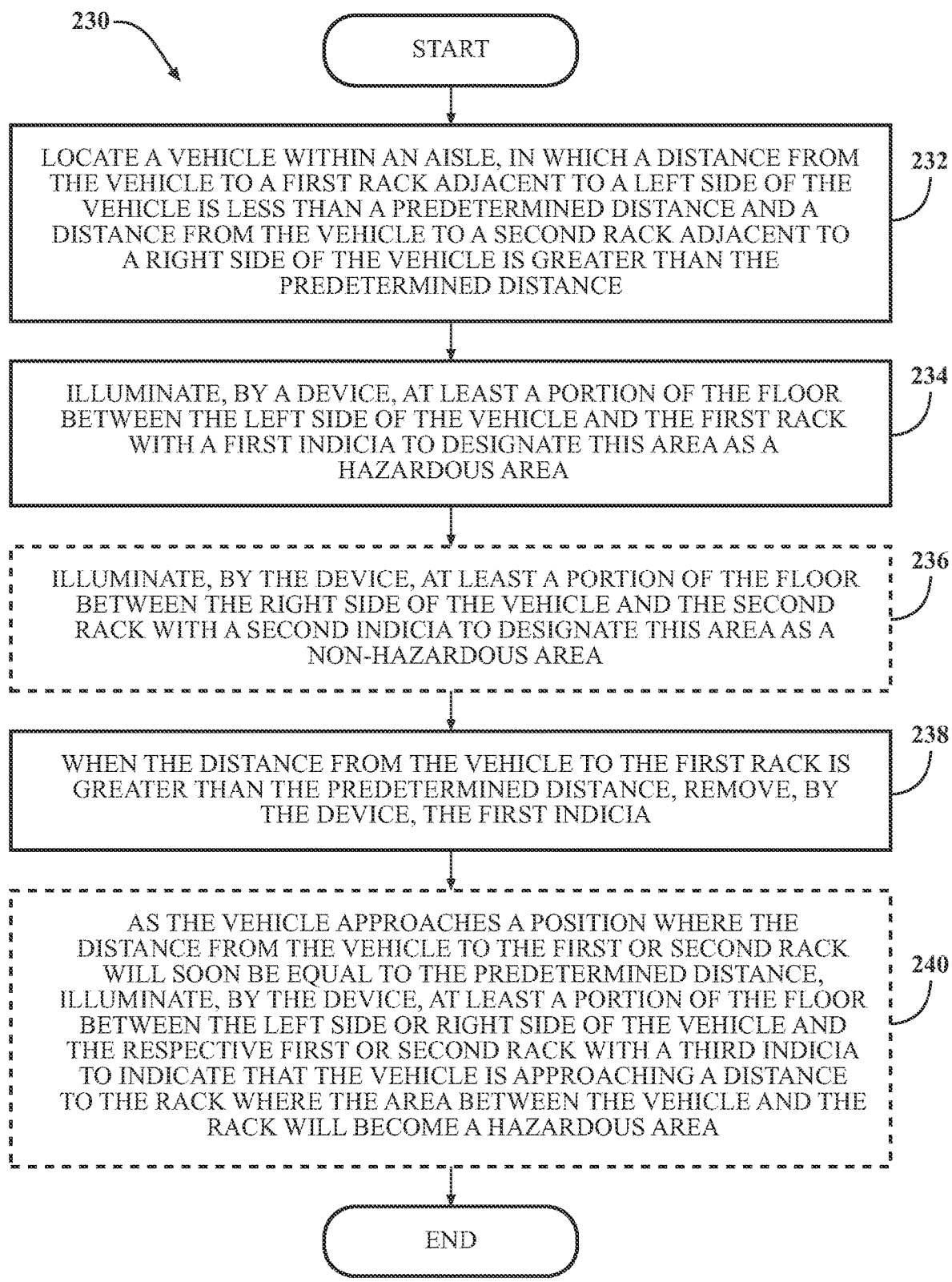
FIG. 4A is a flow chart of an example method for designating an area around a materials handling vehicle as a limited operation or non-limited operation area according to one or more embodiments shown and described herein.

Referring now to FIG. 4A, an exemplary method 230 is shown to illustrate designating an area around the vehicle 10 as a limited operation or non-limited operation area. At step 232, the vehicle 10 is located within an aisle 210 and the distance $D_1$ from the vehicle 10 to a first rack adjacent to the left side LS of the vehicle 10 is less than the predetermined distance, i.e., the first predetermined distance, and concurrently the distance $D_2$ from the vehicle 10 to a second rack adjacent to the right side RS of the vehicle 10 is greater than or equal to the predetermined distance i.e., the first predetermined distance. At step 234, the device 200, actuated by the controller 103, illuminates at least a portion of the floor between the left side LS of the vehicle 10 and the first rack with the first indicia 206 to designate this area as a limited operation area. For example, the controller 103 may control the device 200 such that the device 200 generates a first indicia 206 (see FIG. 4) comprising a first light pattern and a first light color. At optional step 236 (optional steps are indicated by dashed boxes in the figures), the device 200, actuated by the controller 103, concurrently illuminates at least a portion of the floor between the right side RS of the vehicle 10 and the second rack with the second indicia 208 to designate this area as a non-limited operation area. For example, the controller 103 may control the device 200 such that the device 200 generates a second indicia 208 (see FIG. 4) comprising a second light pattern and a second light color. At step 238, once the distance $D_1$ from the vehicle 10 to the first rack is greater than or equal to the predetermined distance, the device 200, in response to being controlled by the controller 103, removes the first indicia 206, and may optionally illuminate at least a portion of the floor between the left side LS of the vehicle 10 and the first rack with the second indicia 208 to designate this area as a non-limited operation area. As another optional step 240, as the vehicle 10 approaches a position where the distance $D_1$ or $D_2$ from the vehicle 10 to the first or second rack will soon be less than the first predetermined distance DA and is currently only less than the second predetermined distance DB, the device 200 illuminates at least a portion of the floor between the corresponding left side LS or right side RS of the vehicle 10 and the respective first or second rack with the third indicia 209 to indicate that the vehicle 10 is approaching a position where the area between the vehicle 10 and the rack will become a limited operation area.

Referring again to FIG. 4, the system 8 may further comprise a sensing system 250 that detects when an operator has exited the operator station 20 of the vehicle 10. The sensing system 250 is also able to distinguish whether an operator exited the vehicle from the first exit 26A or the second exit 26B. The sensing system 250 may comprise, for example, first and second photoelectric sensors, such as light curtain sensors 252A, 252B, one located at the first exit 26A and the other located at the second exit 26B. The light curtain sensors 252A, 252B are capable of detecting an operator passing through the respective exits 26A, 26B so as to distinguish through which exit 26A, 26B the operator exited the vehicle 10. The sensing system 250 may further comprise the operator presence sensors 22 (see FIG. 2), wherein the data from the operator presence sensors 22 may additionally be used to determine that an operator has exited the vehicle 10, and used in combination with the data from the light curtain sensors 252A, 252B to determine through which exit 26A, 26B the operator exited the vehicle 10.

According to embodiments, if the vehicle 10 is positioned within a predefined distance from an object 202, e.g., a wall or rack, that is located adjacent to the side of the vehicle 10 from which an operator exited the vehicle 10, as determined by the sensing system 250, at least one function of the vehicle 10 may be modified by the controller 103, e.g., disabled, limited, or activated. The predefined distance is measured in the lateral direction $L_D$ between the vehicle 10 and the object 202. The predefined distance may be the same as, similar to, or different than the predetermined distance discussed above. This embodiment could be used along with the light source(s) 204, such that when stepping out of the vehicle, the operator will know whether they are stepping into a limited operation zone or a non-limited operation zone, i.e., based on the first or second indicia 206 or 208 illuminated on the floor adjacent to the vehicle 10. Hence, the light source(s) 204 could designate an area to the left side LS or right side RS of the vehicle 10 as a limited operation area when the vehicle is positioned within a predefined distance from an object 202, wherein the predefined distance may be the same as the predetermined distance discussed above.

The function(s) of the vehicle that are modified by the controller 103 may be, for example, traction control/traveling movement of the vehicle, e.g., the maximum allowable speed of the vehicle 10 may be limited or the traction control of the vehicle 10 may be disabled, functions of the load handling assembly, e.g., lift and/or lower may be limited or disabled, remote control functionality of the vehicle 10 via the remote control device 32 may be disabled, a vehicle alert system may be activated, e.g., to initiate an alarm, etc.

As noted above, the data from the operator presence sensors 22 may additionally be used to determine that an operator has exited the vehicle 10. In this regard, the system 250 is additionally capable of detecting a situation wherein, for example, the operator has moved one foot out of the vehicle 10, but the other foot is still inside the vehicle 10, i.e., one of the light curtain sensors 252A or 252B detected a pass through (e.g., the operator's foot/leg passing through), but the operator presence sensors 22 still detect the presence of the operator on the platform 21. In this situation, the aforementioned function(s) of the vehicle may or may not be disabled by the controller 103, and/or the vehicle 10 may issue an alarm or other warning for the operator to move their foot/leg back into the operator station 20. Alternative measures may also be taken, such as, for example stopping the vehicle 10 until the operator returns their foot/leg into the operator station 20.

Figure 4B:
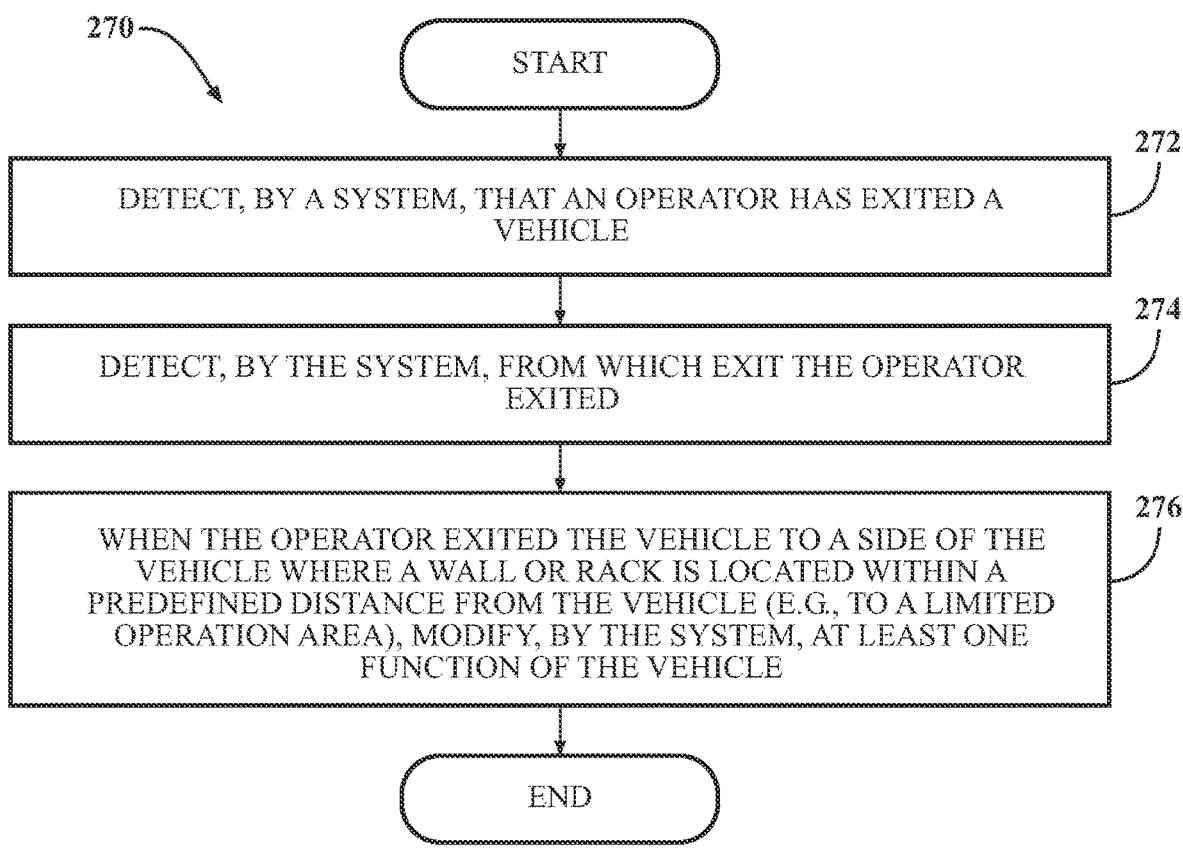
FIG. 4B is a flow chart of an example method for detecting that an operator has exited a materials handling vehicle according to one or more embodiments shown and described herein.
Figure 4C:
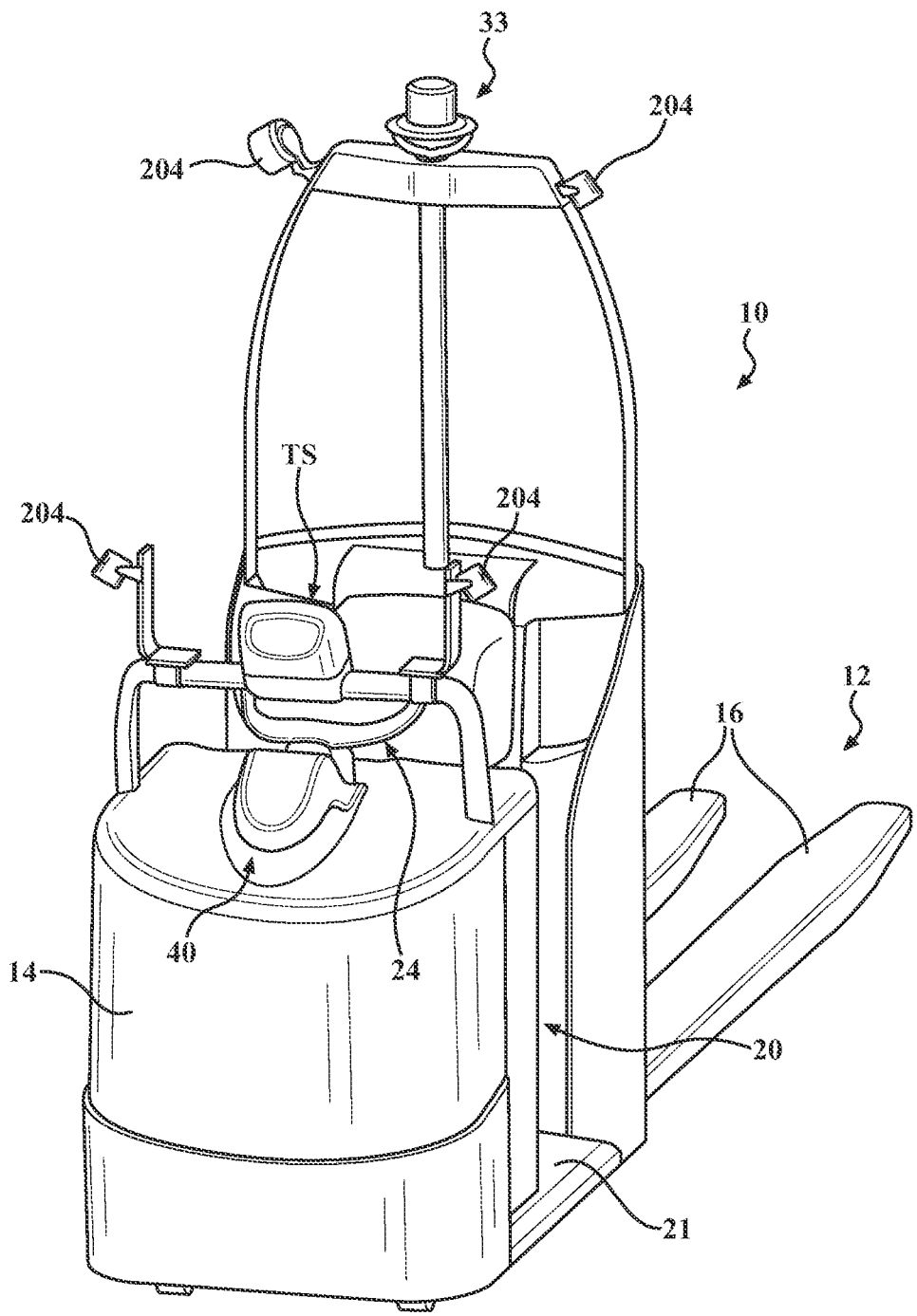
FIG. 4C is a perspective view of another materials handling vehicle according to one or more embodiments shown and described herein.
Figure 4D:
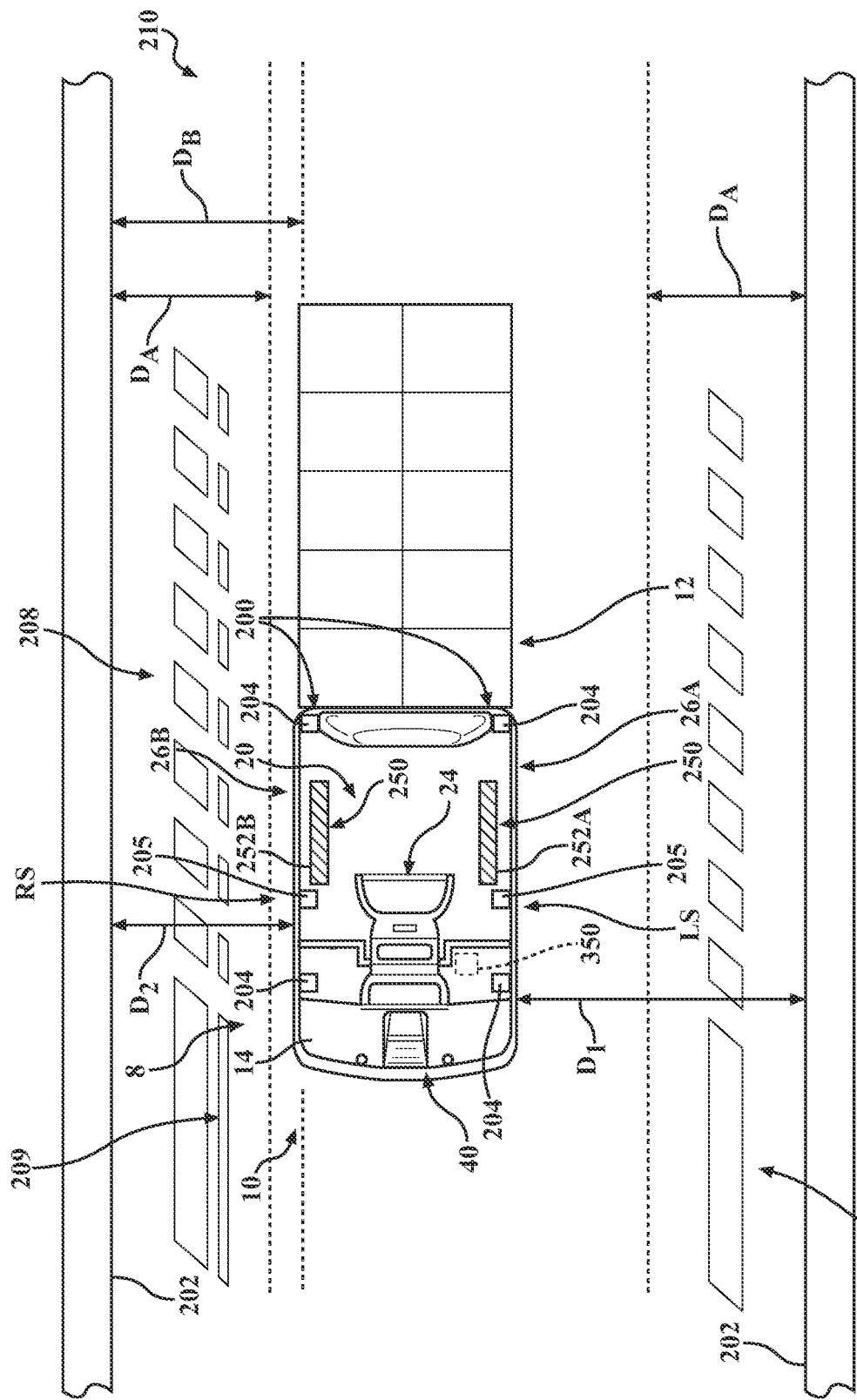
FIG. 4D is a schematic illustration of a materials handling vehicle generating second and third indicia.

With reference now to FIG. 4B, an exemplary method 270 is provided to illustrate detecting that an operator has exited the vehicle 10. At step 272, the system 250 detects that an operator has exited the vehicle 10. At step 274, which may be performed concurrently with step 272, the system 250 detects from which exit 26A, 26B the operator exited. Assuming in this example that the operator exited the vehicle 10 to a side of the vehicle 10 where a boundary object is located within the predefined distance from the vehicle 10, at least one function of the vehicle 10 is modified by the controller 103, e.g., limited, disabled, or activated, at step 276. The at least one function of the vehicle 10 may be returned to its previous state by the controller 103 when the operator performs one or more actions, such as, for example, moving back onto the vehicle 10, moving out of the area between the boundary object and the vehicle 10, actuating a manual input, such as a button/switch, etc. located on the vehicle 10 or on a touchscreen TS (See FIG. 4C), or by shutting down and then restarting the vehicle 10.

This embodiment could also be used with a vehicle that includes only a single exit. That is, if a single-exit vehicle is positioned within the predefined distance from a boundary object (e.g., a wall or rack) that is located adjacent to the side of the vehicle having the exit, at least one function of the vehicle 10 may be disabled as described herein.

This embodiment could also be used with a vehicle that includes two exits, but where only one of the exits would include a light curtain sensor. This configuration could be used, for example, where, while driving in an aisle, the vehicle will always be located closer to one side of the aisle than the other, e.g., a situation where the vehicle always drives along the left or right side of the aisle. In this case, only the exit corresponding to the side of the aisle that the vehicle drives along may include a light curtain sensor.

Figure 5:
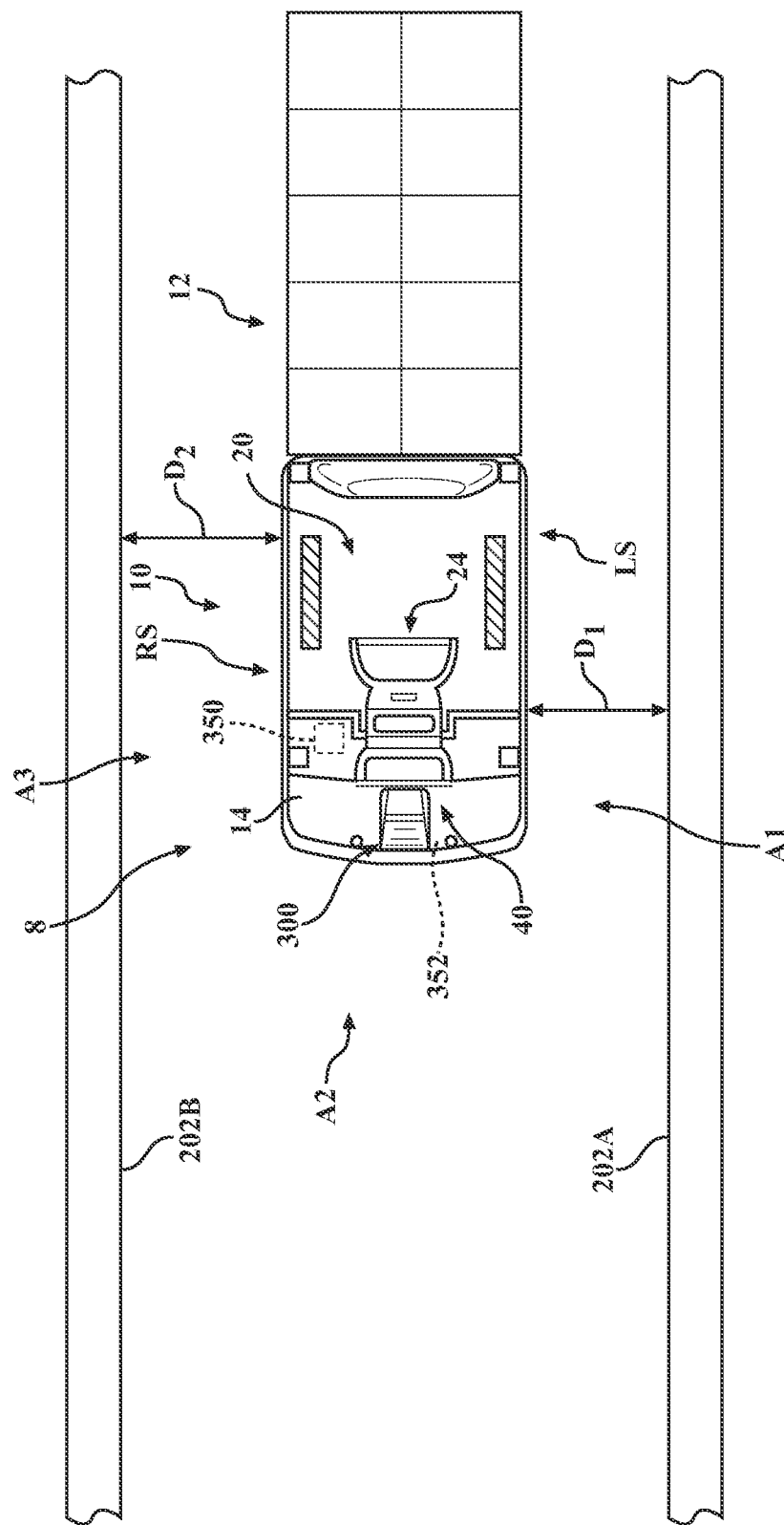
FIG. 5 is a schematic illustration of a materials handling vehicle according to one or more embodiments shown and described herein.

Turning now to FIG. 5, according to an embodiment, the system 8 further includes at least one sensing device 300, which may be the obstacle sensor(s) 40 discussed herein and/or other sensing device(s). The sensing device 300 monitors areas in front of and next to the vehicle 10 on the left and right sides LS, RS thereof. Specifically, the sensing device 300 monitors a first area A1 adjacent to the left side LS of the vehicle 10, a second area A2 in front of the vehicle 10, and a third area A3 adjacent to the right side RS of the vehicle 10. The areas A1, A2, and A3 in FIG. 5 are shown in exemplary locations. Data from the sensing device 300 is used by the controller 103 to identify position information of the vehicle 10 relative to one or more boundary objects 202 near which the vehicle 10 is located. Referring to the embodiment shown in FIG. 5, the position of the vehicle 10 relative to a first rack 202A adjacent to the left side LS of the vehicle 10 is determined by the controller 103, and the position of the vehicle 10 relative to a second rack 202B adjacent to the right side RS of the vehicle 10 is determined by the controller 103. The position information may comprise the lateral distance from the vehicle 10 to the first rack 202A and/or to the second rack 202B.

The position information may be used by the controller 103 to determine if the vehicle 10 is located in an aisle 210. For example, the vehicle 10 may be determined to be located in an aisle 210 if the distance $D_1$ between the vehicle 10 and the first rack 202A, plus the distance $D_2$ between the vehicle 10 and the second rack 202B, plus the width of the vehicle 10 are equal to or within a predefined range to a known width of the aisle 210 (if the distances $D_1$ and $D_2$ were to be measured from the longitudinal axis LA of the vehicle 10 to the respective racks 202A, 202B, as opposed to being measured from the left and right sides LS, RS of the vehicle 10, the width of the vehicle 10 would be taken out of this equation).

The position information may also be used by the controller 103 to determine if the vehicle 10 is located in a desired position within an aisle 210. For example, if the distances from the vehicle 10 to the first and second racks 202A, 202B are equal or within a predetermined tolerance, the vehicle 10 may be determined to be located in the center of the aisle 210. Or, if the distance from the vehicle 10 to one of the first rack 202A or the second rack 202B is equal to or within a predetermined tolerance to a predefined hugging distance (to be discussed below), and, optionally, if the operator is determined by the controller 103 not to be present on the vehicle 10 (e.g., via information from the sensing system 250), it may be determined that the vehicle 10 is in hugging mode (to be described below), or is in the proper position to begin hugging mode.

The position information of the vehicle 10 relative to the boundary object(s) can be used by the controller 103 to modify at least one vehicle parameter. Exemplary vehicle parameters that can be modified in this way include: a maximum allowable travel speed (e.g., based on the position information, the maximum allowable travel speed can be reduced from a normal maximum allowable travel speed to a reduced maximum allowable travel speed or increased from the reduced maximum allowable travel speed to the normal maximum allowable travel speed); a maximum allowable turning angle (e.g., based on the position information, the maximum allowable turning angle can be reduced from a normal maximum allowable turning angle to a reduced maximum allowable turning angle or increased from reduced maximum allowable turning angle to the normal maximum allowable turning angle); a steered-wheel-to-steering-device ratio; one or more vehicle lights (e.g., based on the position information, one or more lights on the vehicle 10 can be switched on or off); a lifting function of the load handling assembly (e.g., based on the position information, lifting/lowering function(s) of the load handling assembly 12 can be adjusted, such as lift/lower speed or a maximum lift height, and/or the load handling assembly 12 may be automatically raised or lowered to a desired height); indicia used to indicate that the vehicle is located in a particular area (e.g., based on the position information, the first, second, or third indicia 206, 208, 209 may be switched on or off); and/or, based on the position information, an alert may be given to indicate the presence of the vehicle 10 in an aisle 210, such as an audible alert, visual alert, alert on a display screen (e.g., the touchscreen TS), etc.

As noted above, the controller 103 receives the steer control signal from the control handle position sensor 100A, which senses the angular position of the control handle 90 within the angular range of approximately +/−60 degrees in the illustrated embodiment. Since a current steer control signal corresponds to a current position of the control handle 90 falling within the range of from about +/−60 degrees and the steered wheel 108 is capable of rotating through an angular range of +/−90 degrees, the controller 103 converts the current control handle position, as indicated by the steer control signal, to a corresponding desired angular position of the steered wheel 108 by multiplying the current control handle position by a steered-wheel-to-steering-device ratio, such as 90/60 or 1.5/1.0, e.g., an angular position of the control handle 90 of +60 degrees equals a desired angular position of the steered wheel 108 of +90 degrees. For example, if the angular position of the control handle 90 is +60 degrees, the controller 103 multiplies +60 degrees by the ratio of 1.5/1.0 to determine a desired angular position of the steered wheel 108 equal to +90 degrees and generates a corresponding steer actuation signal to the steer controller 112.

The steered-wheel-to-steering-device ratio may equal 60/60 or 1.0/1.0. For example, if the angular position of the control handle 90 is +60 degrees, the controller 103 may multiply +60 degrees by the ratio of 1.0/1.0 to determine a desired angular position of the steered wheel 108 equal to +60 degrees.

The controller 103 may modify at least one of a maximum allowable turning angle of the steered wheel 108 or the steered-wheel-to-steering-device ratio when the position information indicates that the vehicle 10 is positioned within a predefined distance from an object 202, such as a wall or a rack that is located adjacent to the side of the vehicle 10. The controller 103 may modify at least one of the maximum allowable turning angle of the steered wheel 108 or the steered-wheel-to-steering-device ratio independent of whether the vehicle is being manually or remotely controlled by an operator. It is also contemplated that the controller 103 may only modify at least one of the maximum allowable turning angle of the steered wheel 108 or the steered-wheel-to-steering-device ratio when an operator is determined to be not present in the operator station 20, e.g., as determined by the sensing system 250, or when an operator is remotely controlling the vehicle 10 with a remote control device 32 that is paired to the vehicle 10.

Figure 4E:
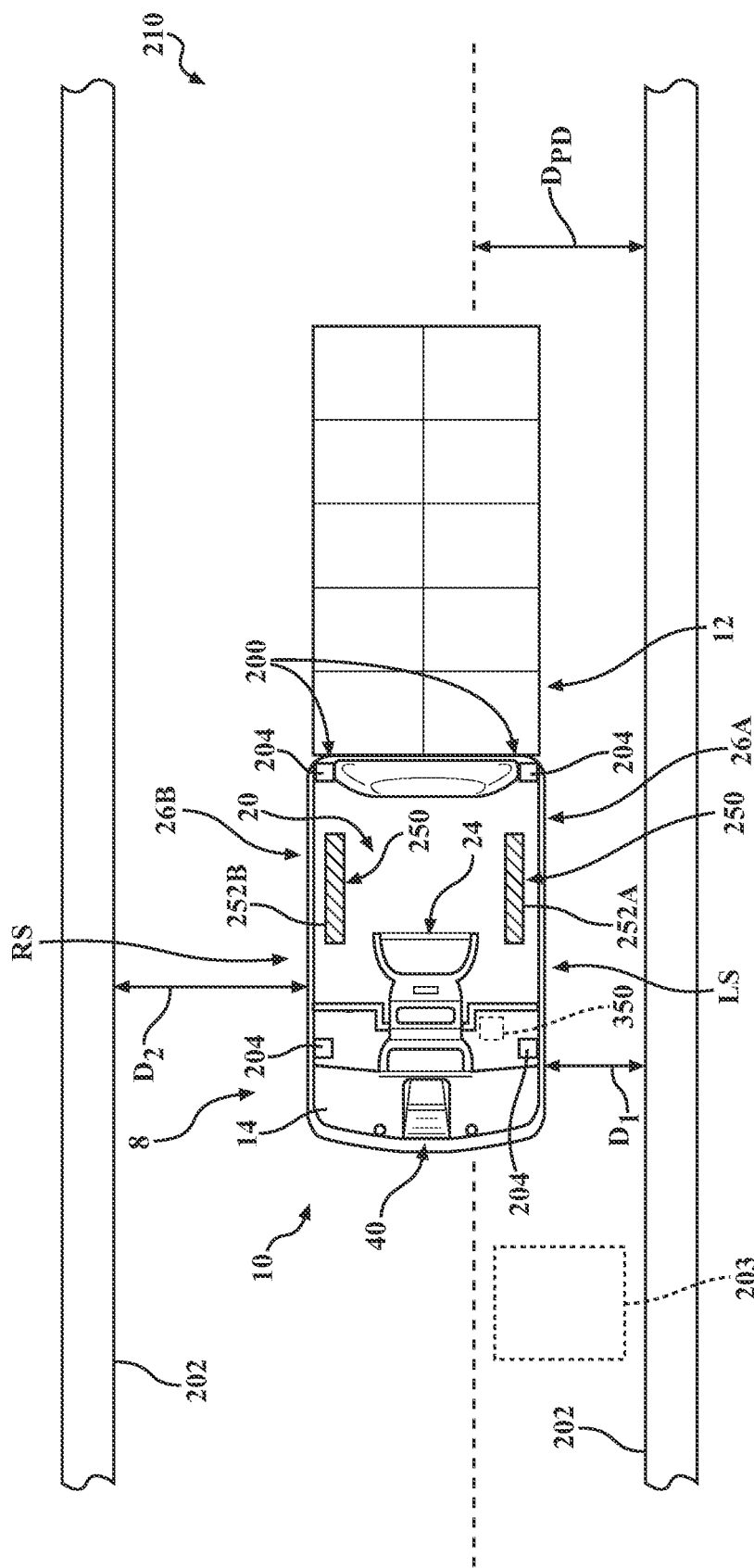
FIG. 4E is a schematic illustration of a materials handling vehicle illustrating operation of the vehicle in accordance with one or more embodiments described herein.

The predefined distance, as noted above, is measured in the lateral direction $L_D$ between the vehicle 10 and the object 202. The predefined distance may be the same as, similar to, or different than the predetermined distance (defined such that when the distance $D_1$ or $D_2$ is less than the predetermined distance, the area corresponding to that distance $D_1$ or $D_2$ may be an area not sufficiently large enough to receive an operator or person while also maintaining a minimum clearance distance between the operator or person and the boundary object 202) discussed above. For example, the controller 103 may reduce the maximum allowable turning angle for the steered wheel 108 from a first maximum allowable turning angle to a second maximum allowable turning angle when the position information indicates that the vehicle 10 is positioned within the predefined distance from the wall or rack, wherein the second maximum allowable turning angle is less than the first maximum allowable turning angle. In FIG. 4E, the vehicle 10 is illustrated as being within a predefined distance DPD of an object 202 such that the maximum allowable turning angle of the steered wheel 108 is reduced to a smaller value, thereby reducing the likelihood that the forks 16 on the vehicle 10 or a load carried by the forks 16 may swing into the wall or rack during a sharp turn. It is also contemplated that when the vehicle 10 is within the predefined distance DPD of an object 202, the steered-wheel-to-steering-device ratio may be changed from a larger ratio (1.5/1.0) to a smaller ratio (1.0/1.0) to make the steering of the steered wheel 108 less sensitive.

In a further example, the controller 103 may modify at least one of a maximum allowable turning angle of the steered wheel 108 or the steered-wheel-to-steering-device ratio when the position information, sensed by the sensing device 300, indicates that the vehicle 10 is positioned within a predefined distance from an object 202, such as a wall or a rack that is located adjacent to the side of the vehicle 10, and object information, also sensed by the sensing device 300, indicates that a further object is in front of or to the side of the vehicle 10, i.e., within a sensing range of the sensing device 300. For example, the controller 103 may reduce the maximum allowable turning angle from a first maximum allowable turning angle to a second maximum allowable turning angle when the position information indicates that the vehicle 10 is positioned within the predefined distance from the wall or rack and the object information indicates that a further object is in front of or to the side of the vehicle, wherein the second maximum allowable turning angle is less than the first maximum allowable turning angle. In FIG. 4E, the vehicle 10 is illustrated as being within a predefined distance DPD of an object 202 and, further, an object 203, such as a box, shown in phantom, is located in front of the vehicle 10 such that the maximum allowable turning angle of the steered wheel 108 is reduced to a smaller value, thereby reducing the likelihood that the forks 16 or a load carried by the forks 16 may swing into the wall or rack during a sharp turn. It is also contemplated that when the vehicle 10 is within the predefined distance DPD of an object 202 and a further object 203 is sensed as being in front of or to the side of the vehicle 10, the steered-wheel-to-steering-device ratio may be changed from a larger ratio to a smaller ratio to make the steering of the steered wheel 108 less sensitive.

Figure 4F:
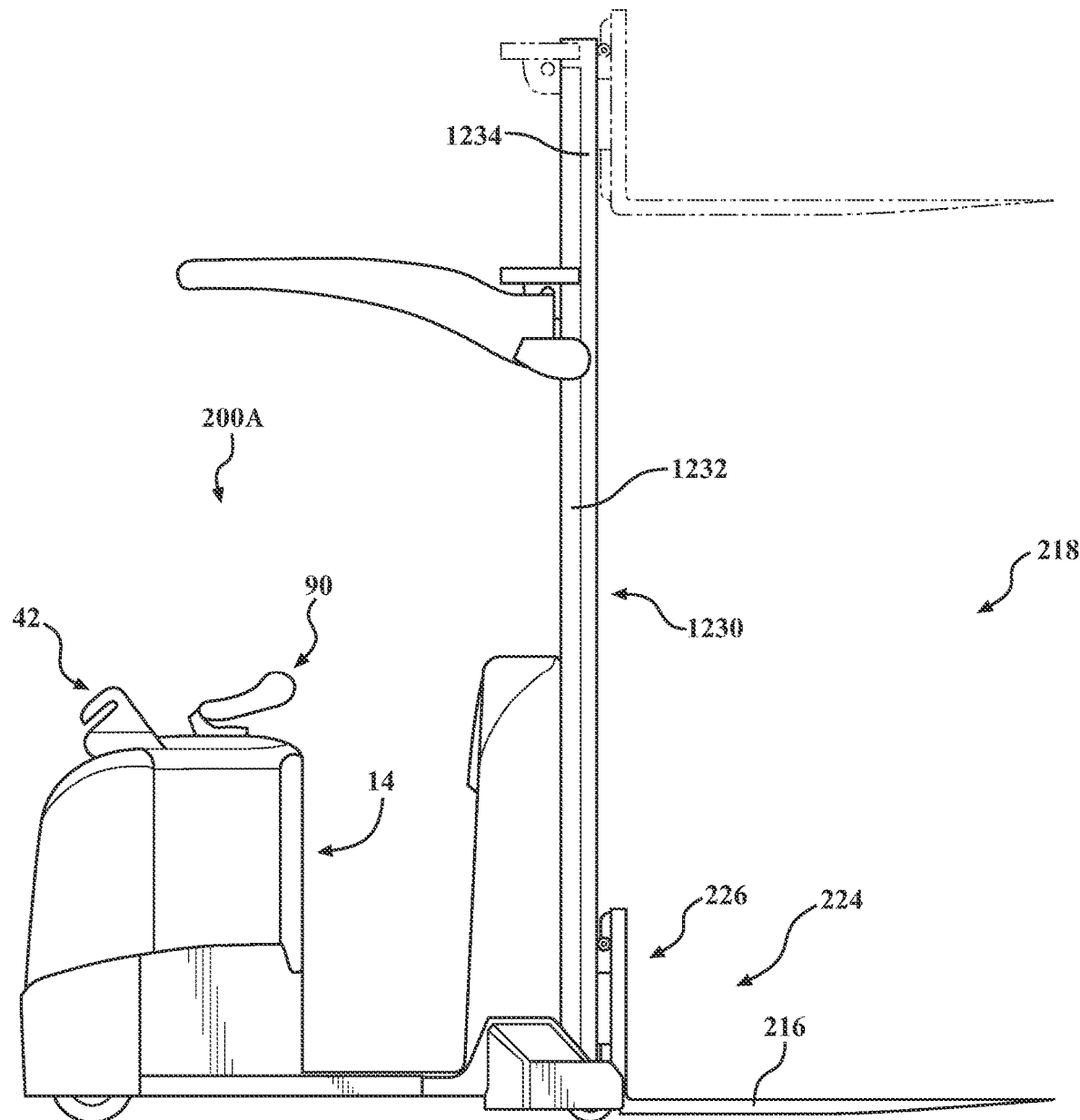
FIG. 4F is a side view of a materials handling vehicle according to another embodiment described herein.

In FIG. 4F, a further materials handling vehicle 200A is illustrated comprising an order picking truck with a mast assembly 1230. The mast assembly 1230 forms part of a load handling assembly 218 coupled to and extending from a power unit 14. The load handling assembly 218 further comprises a fork carriage assembly 224 coupled to the mast assembly 1230 for movement relative to the mast assembly 1230 and with the mast assembly 1230. The fork carriage assembly 224 comprises a fork carriage 226 (also referred to herein as a "lift carriage") and a pair of forks 216 coupled to the fork carriage 226. The mast assembly 1230 comprises one or more mast sections. The exemplary mast assembly 1230 illustrated in FIG. 4F is a two-stage mast assembly comprising first and second mast sections or weldments 1232 and 1234. The fork carriage 226 is attached to and moves relative to the second mast section or weldment 1234 and is lifted relative to the second mast section 1234 via a primary lift ram/cylinder assembly (not illustrated) mounted to the second section 1234. The second section or weldment 1234 moves relative to the first, stationary mast section or weldment 1232, wherein the first mast section 1232 is mounted to the power unit 14. One or more hydraulic secondary lift ram/cylinder assemblies (not shown) are fixed at their cylinder bases to the power unit 14 or first mast section 1232 and the rams are fixed to the second mast section 1234. As the rams of the secondary assemblies extend, the rams cause the second mast section 1234, along with the fork carriage assembly 224, to move relative to the first mast section 1232.

In yet another example, the controller 103 may modify at least one of a load handling assembly lift height, a maximum allowable turning angle of the steered wheel 108 or the steered-wheel-to-steering-device ratio when the position information indicates that the vehicle 10 is positioned within an aisle. The lift height of the lift carriage may define the load handling assembly lift height. For example, the controller 103 may reduce a maximum lift height to which the fork carriage 226 and forks 216 may be raised, i.e., a maximum lift height of the lift carriage, once the sensing device 300 senses and the controller 103 determines that the vehicle 10 is located within an aisle. In a further embodiment, the controller 103 may reduce the maximum lift height to which the fork carriage 226 and forks 216 may be raised only when the sensing device 300 senses and the controller 103 determines that the vehicle 10 is located within an aisle having a designated or predefined aisle width (also referred to herein as "a first aisle width") or a width equal to or less than the predefined or first aisle width. It is noted that some freezers have a low ceiling and also have very narrow aisles. Hence, when the controller 103 determines that the vehicle 200A is moving through a narrow aisle having the designated or first aisle width, the controller 103 will limit the height to which the fork carriage 226 and forks 216 can be elevated to a lower maximum lift height to avoid contacting the ceiling. In a further example, the controller 103 may reduce the maximum allowable turning angle for the steered wheel 108 from a first maximum allowable turning angle to a second maximum allowable turning angle when the position information indicates that the vehicle 10 is located within an aisle, wherein the second maximum allowable turning angle is less than the first maximum allowable turning angle. It is still further contemplated that the controller 103 may modify the maximum allowable turning angle of the steered wheel 108 to a reduced value concurrently with the sensing device 300 first sensing that the vehicle 10 is located within an aisle and may also modify, i.e., return, the maximum allowable turning angle of the steered wheel 108 to its higher value as soon as the sensing device 300 senses that the vehicle 10 is no longer located within an aisle. It is also contemplated that when the controller 103 determines that the vehicle 10 is located within an aisle the steered-wheel-to-steering-device ratio may be changed from a larger ratio (1.5/1.0) to a smaller ratio (1.0/1.0) to make the steering of the steered wheel 108 less sensitive.

In a still further example, the controller 103 may modify at least one of a load handling assembly lift height, a maximum allowable turning angle of the steered wheel 108 or the steered-wheel-to-steering-device ratio when the position information indicates that the vehicle 10 is positioned within an aisle, and object information, sensed by the sensing device 300, indicates that a further object is in front of or to the side of the vehicle 10. For example, the controller 103 may reduce a maximum height to which the fork carriage 226 and forks 216 may be raised, once the sensing device 300 senses and the controller 103 determines that the vehicle 10 is located within an aisle and a further object is in front of or to the side of the vehicle 200A. Further, the controller 103 may reduce the maximum allowable turning angle from a first maximum allowable turning angle to a second maximum allowable turning angle when the position information indicates that the vehicle 10 is positioned within an aisle and the object information indicates that a further object is in front of or to the side of the vehicle, wherein the second maximum allowable turning angle is less than the first maximum allowable turning angle. It is also contemplated that the steered-wheel-to-steering-device ratio may be changed from a larger ratio to a small ratio when the vehicle enters an aisle and an object is detected in front of or to the side of the vehicle 10 to make the steering of the steered wheel 108 less sensitive.

In another example, when the position information indicates that the vehicle 10 is located within an aisle, the controller 103 may modify the load handling assembly lift height by moving the lift carriage 226 to an intermediate height. Thus, when the controller 103 determines that the vehicle has entered an aisle, the controller 103 will automatically raise the lift carriage 226 to an intermediate height such that an operator, when picking items, does not have to bend over to place the items on the forks 216 located in a lower position, i.e., near a surface on which the vehicle is traveling. The intermediate height may be dependent on circumstances in which the vehicle 10 is being operated. For example, the intermediate height may be dependent on the aisle in which the vehicle 10 is currently being operated and/or the operator that is currently operating the vehicle 10. When the vehicle 10 is being operated in an aisle wherein the items to be placed on the forks 216 are large, it may be advantageous for the intermediate height to be preconfigured to a lower position than when the vehicle 10 is being operated in an aisle wherein the items to be placed on the forks 216 are small. Similarly, when the vehicle 10 is being operated by a short operator, it may be advantageous for the intermediate height to be preconfigured to a lower position than when the vehicle 10 is being operated by a tall operator.

Moreover, in the case where the position information is used by the controller 103 to modify multiple vehicle parameters, select one(s) of the vehicle parameters may be modified only situationally. For example, one or more of the vehicle parameters may be modified by the controller 103 only when an operator is determined to be not present in the operator station 20, e.g., as determined by the sensing system 250. As another example, one or more of the vehicle parameters may be modified by the controller 103 only when an operator is remotely controlling the vehicle 10 with a remote control device 32 that is paired to the vehicle 10.

Figure 5A:
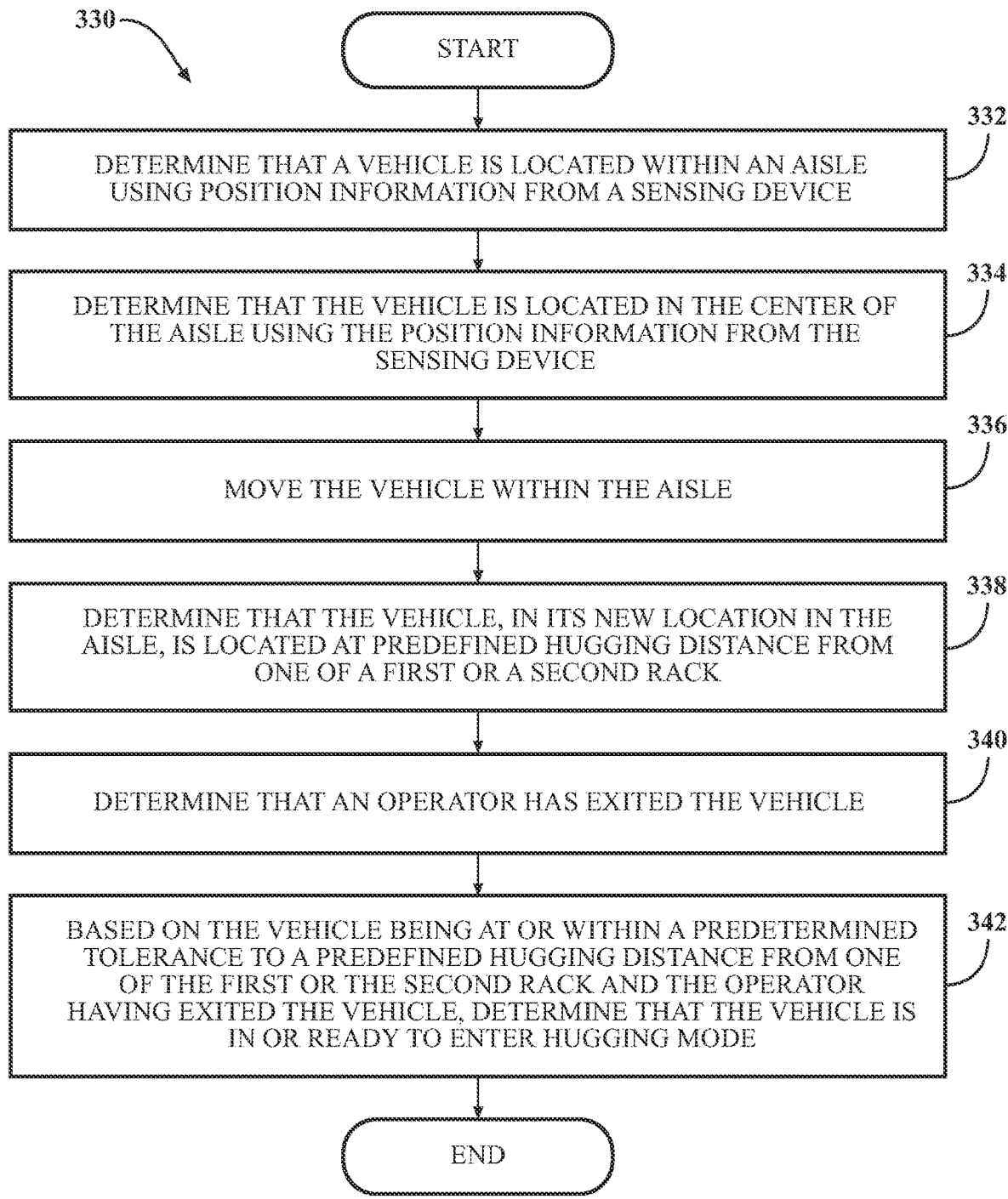
FIG. 5A is a flow chart of an example method for determining position information of a materials handling vehicle according to one or more embodiments shown and described herein.

With reference now to FIG. 5A, an exemplary method 330 is shown to illustrate determining position information of the vehicle 10. At step 332, the vehicle 10 is determined to be located within an aisle 210 by the controller 103 using the position information from the sensing device 300. According to this step 332, the position information is used to determine that the distance $D_1$ from the vehicle 10 to a first rack 202A on a first side of the vehicle 10, plus the distance $D_2$ from the vehicle 10 to a second rack 202B positioned on a second side of the vehicle, plus the width of the vehicle 10 (assuming the distances $D_1$ and $D_2$ are measured from the left and right edges of the vehicle 10 to the respective racks 202A, 202B) are equal to or within a predefined range to a known width of the aisle 210.

At step 334, the vehicle 10 is determined to be located in the center of the aisle 210 by the controller 103 using the position information from the sensing device 300, when the distance $D_1$ from the vehicle 10 to the first rack 202A is equal to or within a predetermined tolerance to the distance $D_2$ from the vehicle 10 to the second rack 202B. The vehicle 10 is then moved within the aisle 210 at step 336, e.g. by the operator using the operator controls 24 or the remote control device 32. In its new location in the aisle 210, at step 338 the vehicle 10 is determined by the controller 103 to be located at or within a predetermined tolerance to a predefined hugging distance (the hugging distance is explained in more detail below) from one of the first or the second rack 202A or 202B. At step 340 the operator is determined to have exited the operator station 20, e.g., by the controller 103 using information from the sensing system 250. Based on the vehicle 10 being at or within a predetermined tolerance to the predefined hugging distance from one of the first or the second rack 202A or 202B, and based on the operator having exited the vehicle 10, the vehicle 10 is determined by the controller 103 to be in or ready to enter hugging mode at step 342. It is noted that, while the predefined hugging distance may be set such that the vehicle 10 is maintained in the center of the aisle 210 while the vehicle 10 is hugging an object, this exemplary embodiment assumes that the predefined hugging distance is set such that the vehicle 10 will be located closer to one of the first or the second rack 202A or 202B than the other.

In accordance with another embodiment, the system 8 may further include a positioning assistance system 350, as shown in FIGS. 5, and 6A-6E. The positioning assistance system 350, which may be incorporated into the controller 103, provides assistance to an operator that is driving the vehicle 10, such as by using the operator controls 24 to position the vehicle 10 within an aisle 210. The positioning assistance system 350 receives information from the sensing device 300 to determine the distances $D_1$ and $D_2$ from the vehicle 10 to one or more boundary objects, e.g., first and second racks 202A and 202B located on the respective left and right sides LS, RS of the vehicle 10, and also to determine the heading of the vehicle 10 relative to the boundary object(s), wherein the heading is defined as the angle that the truck is oriented within the aisle 210 with respect to at least one of the boundary object(s).

The assistance provided by the positioning assistance system 350 may comprise at least one of audible, tactile, or visual cue(s) to indicate at least one of a spacing from the vehicle 10 to at least one boundary object, e.g., a distance, such as a lateral distance, from the vehicle 10 to a boundary object, and/or a heading of the vehicle 10 with respect to the boundary object. In this regard, the positioning assistance system 350 comprises a cue device 352 for implementing the audible, tactile, and/or visual cues. For example, the audible, tactile, and/or visual cues may be actuated to indicate that: the vehicle is located at a distance that is equal to or greater than a desired distance from the boundary object; the vehicle is located at a proper heading with respect to the boundary object; the vehicle is not located at a distance that is equal to or greater than the desired distance from the boundary object; and/or the vehicle is not located at the proper heading with respect to the boundary object. Cues for indicating different information may be distinguishable from one another so as to relay to the operator the meaning of the cue.

FIGS. 6A-6E depict a vehicle 10 progressively entering an aisle 210 while being manually driven by an operator Op, who is shown in an exemplary position on the vehicle 10 in FIGS. 6A-6E. FIGS. 6A-6E show exemplary positions of the vehicle 10 during one particular iteration of the operator Op driving the vehicle 10 into the aisle 210. It is understood that, in practice, an operator may take any number of different paths into an aisle, with appropriate responses by the positioning assistance system 350 based on the position of the vehicle 10.

Figure 6A:
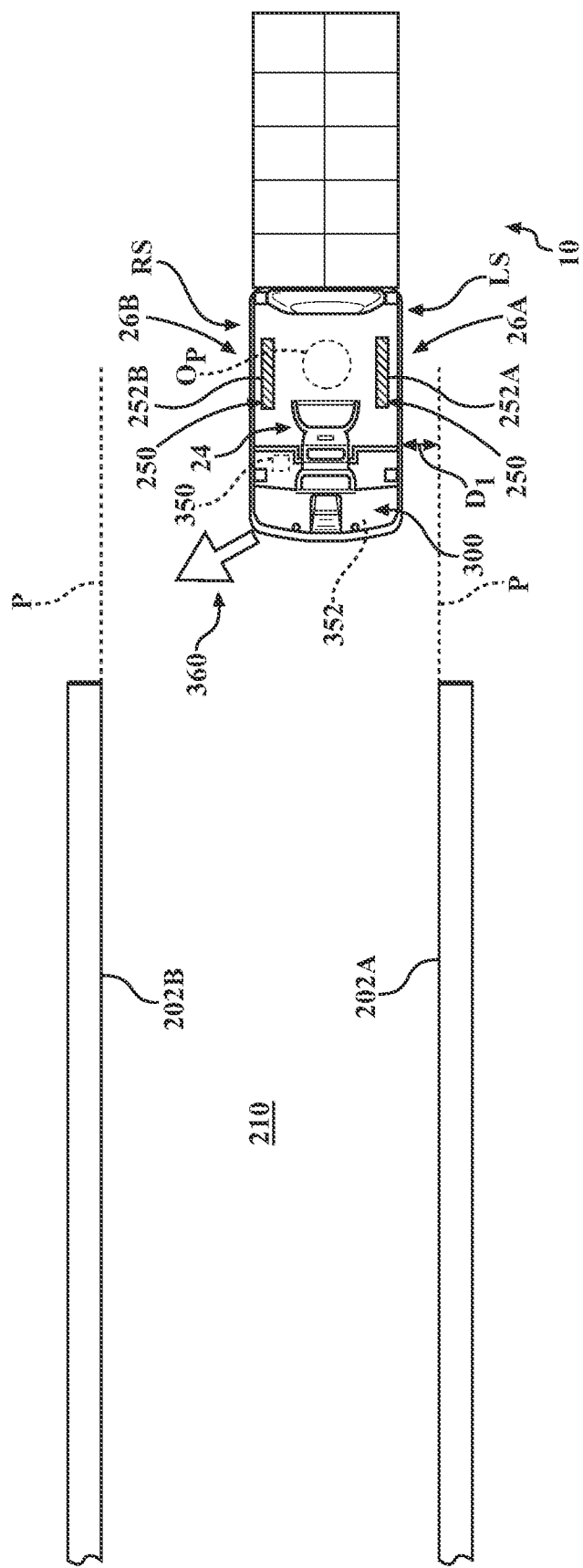
FIGS. 6A-6E are schematic illustrations of a materials handling vehicle progressively being driven into an aisle by an operator according to one or more embodiments shown and described herein.

In FIG. 6A, the distance $D_1$ from the vehicle 10 to a first rack 202A (as noted above, the distances $D_1$ and $D_2$ are measured between the vehicle 10 and the racks 202A, 202B in the lateral direction $L_D$) is less than the desired distance, i.e., distance $D_1$ from the vehicle 10 to the first rack 202A is not equal to or greater than the desired distance. In this situation, the positioning assistance system 350 may issue an audible, tactile, and/or visual first cue 360 in a first manner for the operator Op to steer the vehicle 10 away from the first rack 202A. If the first cue 360 is a visual cue, it may be displayed by the cue device 352 on the floor in front of the vehicle 10 and to the right side RS thereof. As an example, the first cue 360 is shown in FIG. 6A as an arrow pointing away from the first rack 202A, indicating that the vehicle 10 must be steered to the right, but any suitable cue 360 could be used. As another example, the first cue 360 may be shown on a display device (e.g., as a message or as an arrow pointing to the right on the touchscreen TS shown in FIG. 4C) located on the vehicle 10. It is noted that the terms first, second, third, etc. as used herein with respect to the various cues described are not meant to be limited to be used for the stated purpose, i.e., the various cues described herein for FIGS. 6A-6E follow a specific exemplary progression of the vehicle 10 being driven by the operator Op into the aisle 210. Thus, the action associated with the "first cue" described herein could be associated with a second, third, etc. cue in another progression of a vehicle 10 being driven by an operator Op into an aisle 210.

Figure 6B:
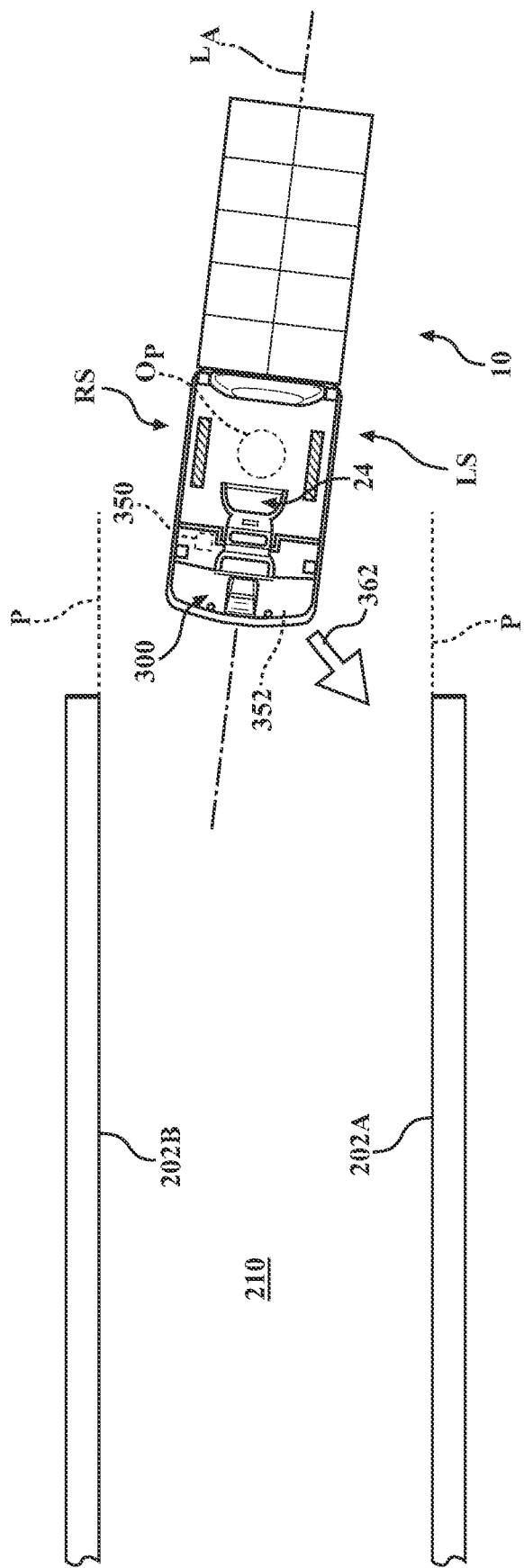

Moving on to FIG. 6B, the operator Op has steered the vehicle 10 away from the first rack 202A and toward the second rack 202B. In FIG. 6B, the vehicle 10 is no longer in a position where the distance $D_1$ from the vehicle 10 to the first rack 202A is less than the desired distance, such that the first cue 360 has been turned off (another cue distinguishable from the first cue 360 may be actuated by the positioning assistance system 350, at least briefly or intermittently, to indicate that the distance $D_1$ from the vehicle 10 to the first rack 202A is greater than or equal to the desired distance). However, in FIG. 6B, the vehicle 10 is not located at a proper heading with respect to the second rack 202B. A proper heading of the vehicle 10 may be defined as a heading of the vehicle 10 with respect to a boundary object, such as one or both of the racks 202A, 202B that is within a predefined range, for example, wherein the longitudinal axis LA of the vehicle 10 is from 0 to 10 degrees relative to a plane P defined by the edge of the respective rack 202A or 202B. In this situation, the positioning assistance system 350 may issue an audible, tactile, and/or visual second cue 362 in a second manner for the operator Op to steer the vehicle 10 away from the second rack 202B in order to reduce the angle of the vehicle 10 relative to the second rack 202B. If the second cue 362 is a visual cue, it may be displayed by the cue device 352 on the floor in front of the vehicle 10 and to the left side LS thereof. As an example, the second cue 362 is shown in FIG. 6B as an arrow pointing away from the second rack 202B, indicating that the vehicle 10 must be steered to the left, but any suitable cue 362 could be used. As another example, the second cue 362 may be shown on the display device (e.g., as a message or as an arrow pointing to the left on the touchscreen TS). It is noted that in a typical aisle 210, the first and second racks 202A, 202B are generally parallel, such that the vehicle 10 may be determined to be at a proper or improper heading with respect to either of the racks 202A, 202B.

Figure 6C:
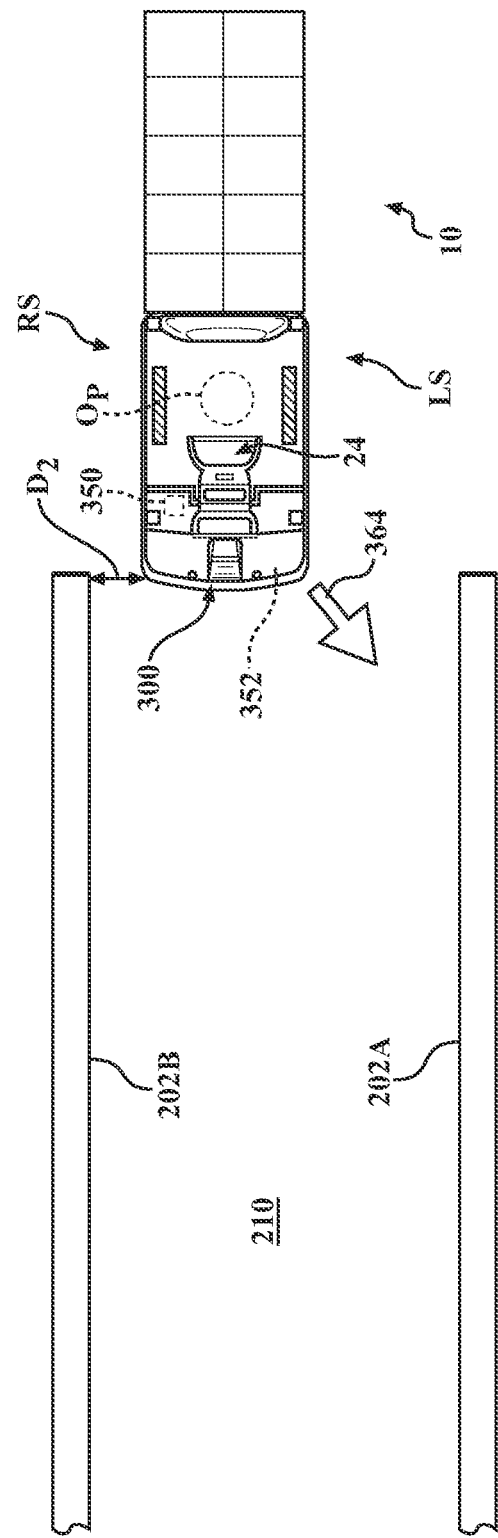

Turning now to FIG. 6C, the operator Op has steered the vehicle 10 away from the second rack 202B and toward the first rack 202A, thus changing the heading of the vehicle 10. In FIG. 6C, the vehicle 10 is no longer in a position where the heading with respect to the second rack 202B is improper, such that the second cue 362 has been turned off (another cue distinguishable from the second cue 362 may be actuated by the positioning assistance system 350, at least briefly or intermittently, to indicate that the vehicle 10 is no longer in a position where the heading with respect to the second rack 202B is improper). However, in FIG. 6C, the distance $D_2$ from the vehicle 10 to the second rack 202B is less than the desired distance. In this situation, the positioning assistance system 350 may issue an audible, tactile, and/or visual third cue 364 in a third manner for the operator Op to steer the vehicle 10 away from the second rack 202B. If the third cue 364 is a visual cue, it may be displayed by the cue device 352 on the floor in front of the vehicle 10 and to the left side LS thereof. As an example, the third cue 364 is shown in FIG. 6C as an arrow pointing away from the second rack 202B, indicating that the vehicle 10 must be steered to the left, but any suitable cue 364 could be used. As another example, the third cue 364 may be shown on the display device (e.g., as a message or as an arrow pointing to the left on the touchscreen TS).

Figure 6D:
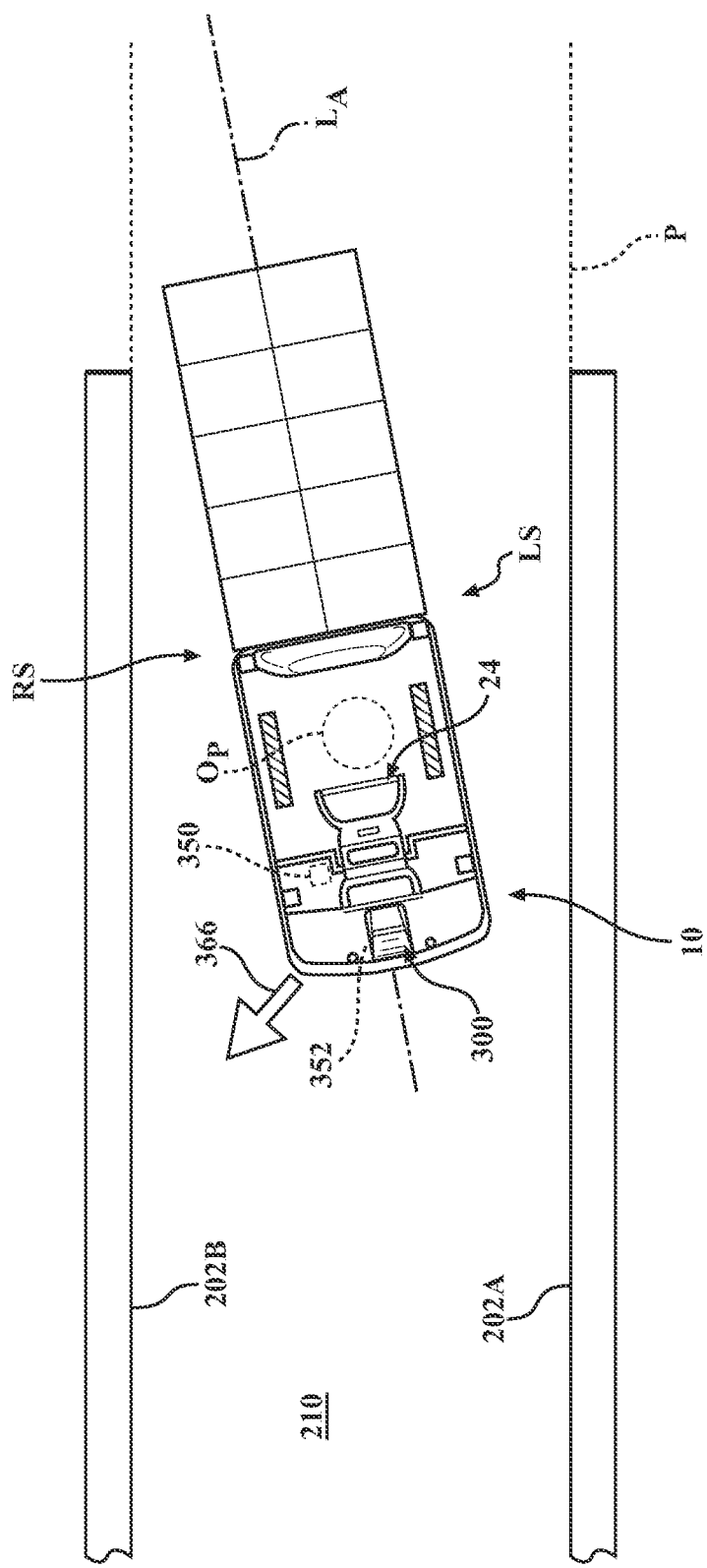

With reference now to FIG. 6D, the operator Op has steered the vehicle 10 away from the second rack 202B and toward the first rack 202A. In FIG. 6D, the vehicle 10 is no longer in a position where the distance $D_2$ from the vehicle 10 to the second rack 202B is less than the desired distance, such that the third cue 364 has been turned off (another cue distinguishable from the third cue 364 may be actuated by the positioning assistance system 350, at least briefly or intermittently, to indicate that the distance $D_1$ from the vehicle 10 to the second rack 202B is greater than or equal to the desired distance). However, in FIG. 6D, the vehicle 10 is not located at a proper heading with respect to the first rack 202A. In this situation, the positioning assistance system 350 may issue an audible, tactile, and/or visual fourth cue 366 in a fourth manner for the operator Op to steer the vehicle 10 away from the first rack 202A in order to reduce the angle of the vehicle 10 relative to the first rack 202A. If the fourth cue 366 is a visual cue, it may be displayed by the cue device 352 on the floor in front of the vehicle 10 and to the right side RS thereof. As an example, the fourth cue 366 is shown in FIG. 6D as an arrow pointing away from the first rack 202A, indicating that the vehicle 10 must be steered to the right, but any suitable cue 366 could be used. As another example, the fourth cue 366 may be shown on the display device (e.g., as a message or as an arrow pointing to the right on the touchscreen TS).

Figure 6E:
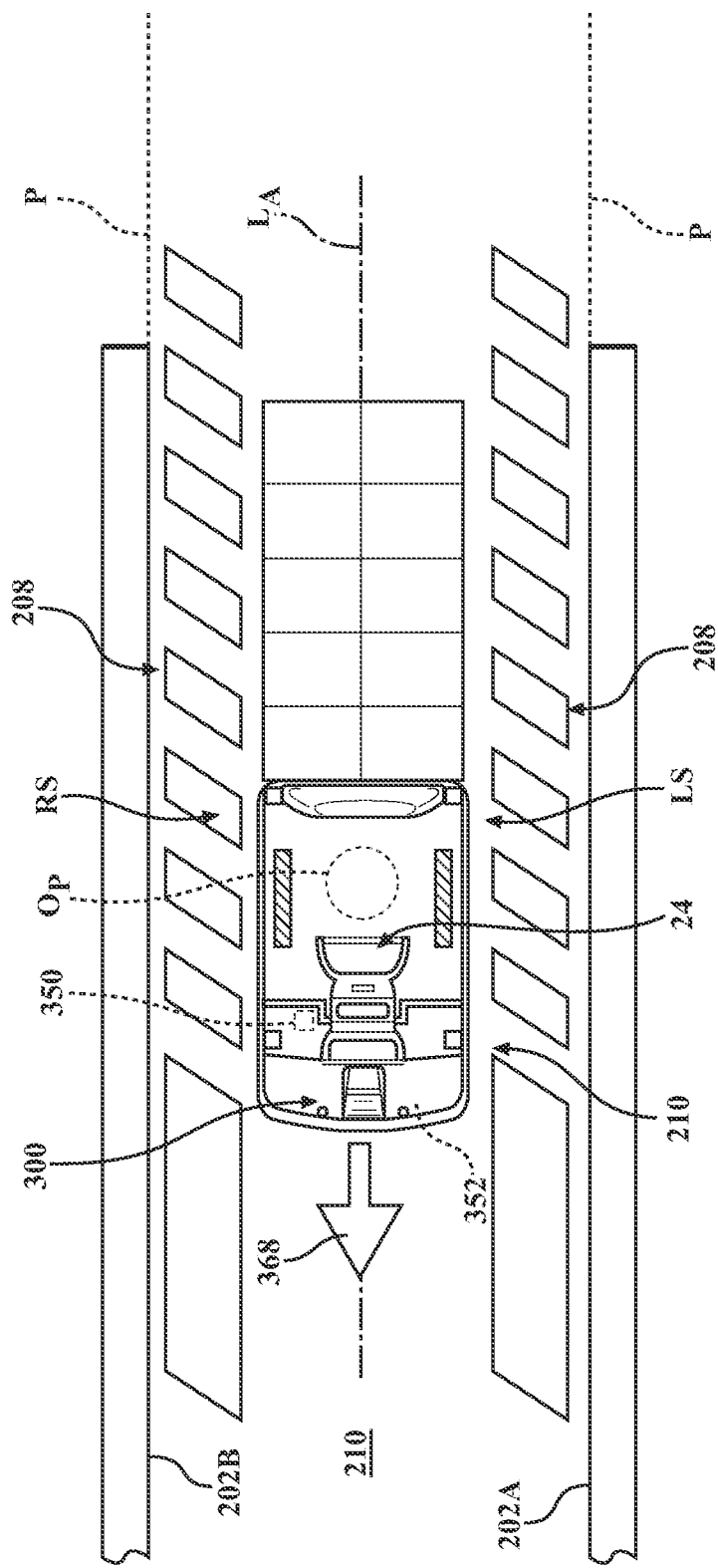

Referring finally to FIG. 6E, the vehicle 10 is positioned generally in the center of the aisle 210, is located at a distance that is equal to or greater than the desired distance from both the first and second racks 202A, 202B, and has a straight heading with respect to the first and second racks 202A, 202B, i.e., the longitudinal axis LA of the vehicle 10 in FIG. 6E is generally parallel to the planes P defined by the edges of the first and second racks 202A, 202B. In this situation, the positioning assistance system 350 may, at least briefly or intermittently, issue an audible, tactile, and/or visual fifth cue 368 in a fifth manner for the operator Op that the vehicle 10 is located at a distance equal to or greater than the desired distance from the first and second racks 202A, 202B, and that the vehicle 10 is oriented at the proper heading. As an example, the fifth cue 368 is shown in FIG. 6E as an arrow on the floor pointing straight down the aisle 210, but any suitable cue 368 could be used. As another example, the fifth cue 368 may be shown on the display device (e.g., as a message or as an indica, such as a checkmark, on the touchscreen TS). As another feature, separate cues may be used to indicate that the vehicle 10 is located at a position equal to or greater than the desired distance from the racks 202A, 202B, and that the vehicle 10 is oriented at the proper heading. It is noted that the positioning assistance system 350 may issue separate audible, tactile, and/or visual cues for the operator Op that the vehicle 10 is located at a distance equal to or greater than the desired distance from the first and second racks 202A, 202B, and that the vehicle 10 is oriented at the proper heading.

One or more of the cues 360, 362, 364, 366, 368 may be distinguishable from one or more of the others. For example, if the cues 360, 362, 364, 366, 368 are visual cues, they may be different colors or shapes, have different illumination patterns (blinking, changing intensity, size), etc.

Only once the vehicle 10 is located at a position where the distances $D_1$ and $D_2$ are equal to or greater than the desired distance from both racks 202A, 202B, and the vehicle 10 is oriented at the proper heading, the vehicle 10 is able to be remotely controlled by an operator using the remote control device 32, i.e., the vehicle 10 is not able to be remotely controlled by an operator using the remote control device 32 unless the vehicle 10 is located at a position where the distances $D_1$ and $D_2$ are equal to or greater than the desired distance from both racks 202A, 202B, and the vehicle 10 is oriented at the proper heading. As noted above, the positioning assistance system 350 may issue an audible, tactile, and/or visual fifth cue 368 to indicate this positioning of the vehicle 10. While being remotely controlled, the vehicle may be capable of being operated in hugging mode, where the vehicle 10 moves down the aisle 210 and hugs one of the first or second racks 202A or 202B, wherein while hugging the rack 202A or 202B, the vehicle 10 maintains the predefined hugging distance from the rack 202A or 202B being hugged.

Figure 6F:
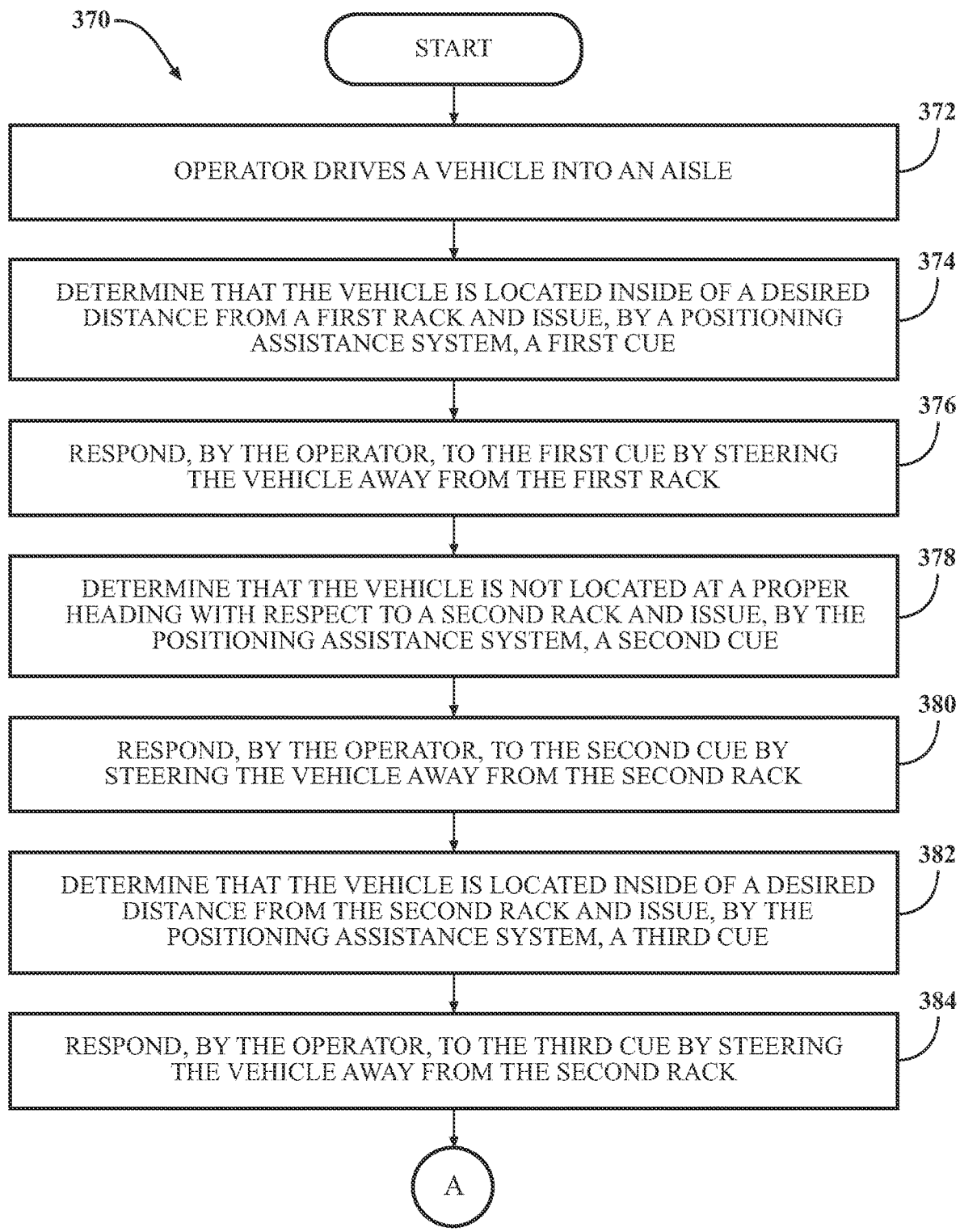
FIGS. 6F and 6G depict a flow chart of an example method for assisting an operator to properly position a materials handling vehicle in an aisle according to one or more embodiments shown and described herein.
Figure 6G:
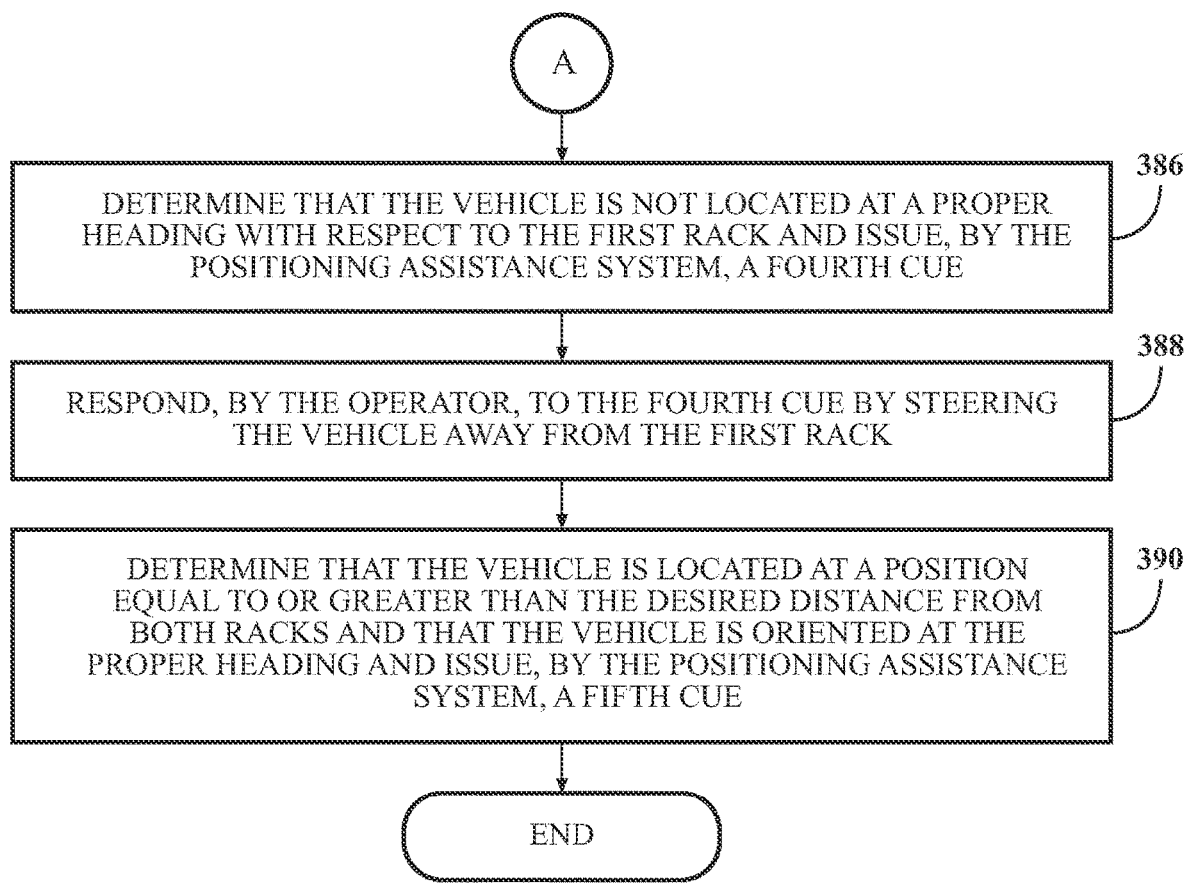

With reference to FIGS. 6F and 6G, an exemplary method 370 is shown to illustrate assisting an operator to properly position the vehicle 10 in the aisle 210. It is noted that the sequence of the steps listed below and shown in FIGS. 6F and 6G could be in a different order, and/or these steps could repeat themselves based on the position of the vehicle 10 as it is entering the aisle 210 and/or as the vehicle 10 is driven within the aisle 210.

At step 372, the operator Op is driving the vehicle 10 into the aisle 210, e.g., using the operator controls 24 on the vehicle 10. At step 374, it is determined that the vehicle 10 is located inside of the desired distance from the first rack 202A, and a first cue 360 is issued by the positioning assistance system 350. At step 376, the operator OP responds to the first cue 360 by steering the vehicle 10 away from the first rack 202A, and once the vehicle 10 is located outside of the desired distance from the first rack 202A, the first cue 360 is turned off.

At step 378, it is determined that the vehicle 10 is not located at a proper heading with respect to the second rack 202B, and a second cue 362 is issued by the positioning assistance system 350. At step 380, the operator Op responds to the second cue 362 by steering the vehicle 10 relative to the boundary object, e.g., away from the second rack 202B in the embodiment shown, and once the vehicle 10 is within the range that defines the proper heading of the vehicle 10 with respect to the second rack 202B, the second cue 362 is turned off.

At step 382, it is determined that the vehicle 10 is located inside of the desired distance from the second rack 202B, and a third cue 364 is issued by the positioning assistance system 350. At step 384, the operator Op responds to the third cue 364 by steering the vehicle 10 away from the second rack 202B, and once the vehicle 10 is located outside of the desired distance from the second rack 202B, the third cue 364 is turned off.

After turning away from the second rack 202B, at step 386, it is determined that the vehicle 10 is not located at a proper heading with respect to the first rack 202A, and a fourth cue 366 is issued by the positioning assistance system 350. At step 388, the operator Op responds to the fourth cue 366 by steering the vehicle 10 away from the first rack 202A, and once the vehicle 10 is within the range that defines the proper heading of the vehicle 10 with respect to the first rack 202A, the fourth cue 366 is turned off.

At step 390, it is determined that the vehicle 10 is located at a position equal to or greater than the desired distance from both racks 202A, 202B, and the vehicle 10 is oriented at the proper heading with respect to the first and second racks 202A, 202B. With both of these criteria being met, a fifth cue 368 is issued by the positioning assistance system 350, indicating that the vehicle 10 is in a position where it is able to be operated remotely by the operator Op using the remote control device 32.

Figure 8:
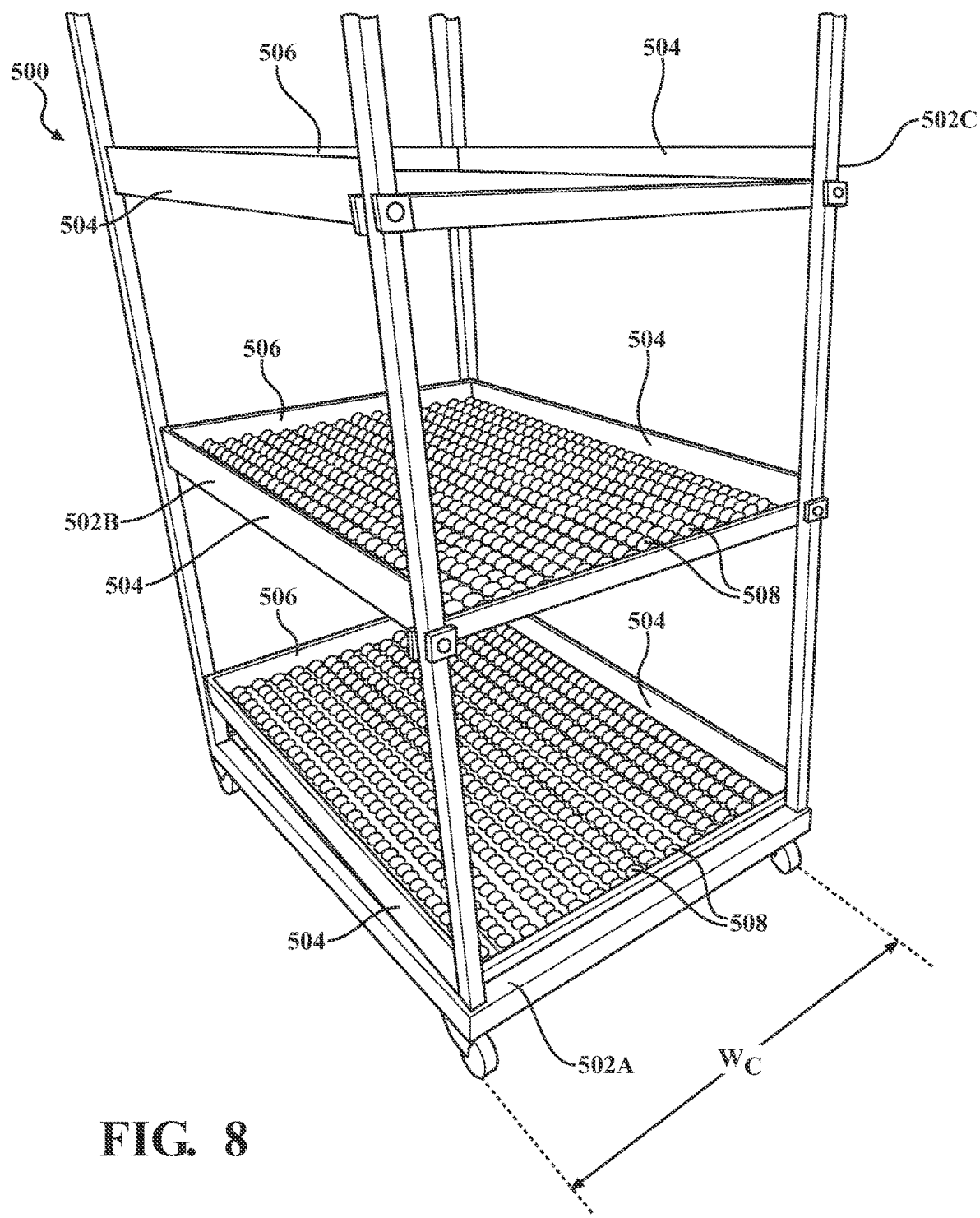
FIG. 8 is a perspective view of a cart according to one or more embodiments shown and described herein.

With reference now to FIG. 7, a materials handling vehicle 10 according to an embodiment may be equipped with a load handling assembly 12 that has shorter forks 16 than a traditional materials handling vehicle of the same type. Forks 16' having a traditional fork length $L_T$ are shown in FIG. 7 in dashed/phantom lines, and forks 16 having lengths $L_{SF}$ according to an embodiment are shown in FIG. 8 in solid lines. Exemplary traditional forks 16' for the type of vehicle 10 shown in FIG. 7 have a length $L_T$ of about 2400 mm to about 2880 mm, and exemplary forks 16 according to an embodiment have a length $L_{SF}$ of about 1000 mm to about 2150 mm.

A cart 500 for use with a materials handling vehicle according to another embodiment is shown in FIG. 8. The cart 500 may comprise a removable or permanent part of the loading handling assembly 12 and includes one or more shelves or levels 502A, 502B, 502C (the cart 500 includes three levels in the embodiment shown, but any number of levels can be used), where each level 502A-502C supports items picked by the operator. Each level 502A-502C may include sidewalls 504 at left and right sides of the cart 500 and a backwall 506 at the back of the cart, which sidewalls 504 and backwall 506 prevent picked items from falling out of the cart 500 and also from extending outwardly from the sides or back of the cart 500. A width $W_C$ of the cart 500 may be equal to or less than the width of the vehicle 10.

The cart 500 further includes rollers 508, which enable picked items to be rolled toward the backwall 506 of the cart 500 as the items are picked by the operator and placed on the cart 500.

Each of the features of the cart 500, i.e., the sidewalls 504 and backwall 506, the width $W_C$, and the rollers 508, in addition to the shorter forks 16 described in FIG. 7, allow a materials handling vehicle 10 to drive and turn in a narrow aisle 210, while militating against contact of the forks 16, the cart 500, and/or the picked items with walls or racks in the aisle 210. Specifically, due to the shorter forks 16, during a turning maneuver, the forks 16 do not swing out to the opposite side of the turn as far as traditional forks. The sidewalls 504 and backwalls 506 of the cart 500 help to prevent picked items on the cart 500 from extending outwardly from the sides and back of the cart 500, so as to avoid contact with the walls or racks in the aisle 210. The width $W_C$ of the cart 500 being no greater than the width of the vehicle 10 prevents the sides of the cart 500 from extending outwardly past the sides of the vehicle 10, so as to avoid contact of the cart 500 with the walls or racks. The rollers 508 permit an operator to load the cart 500 with picked items from the back of the cart 500, such that the operator can walk behind the vehicle 10 while remotely controlling the vehicle 10 with the remote control device 32, as opposed to walking alongside the vehicle 10 where space might be limited in a narrow aisle 210.

Figure 9:
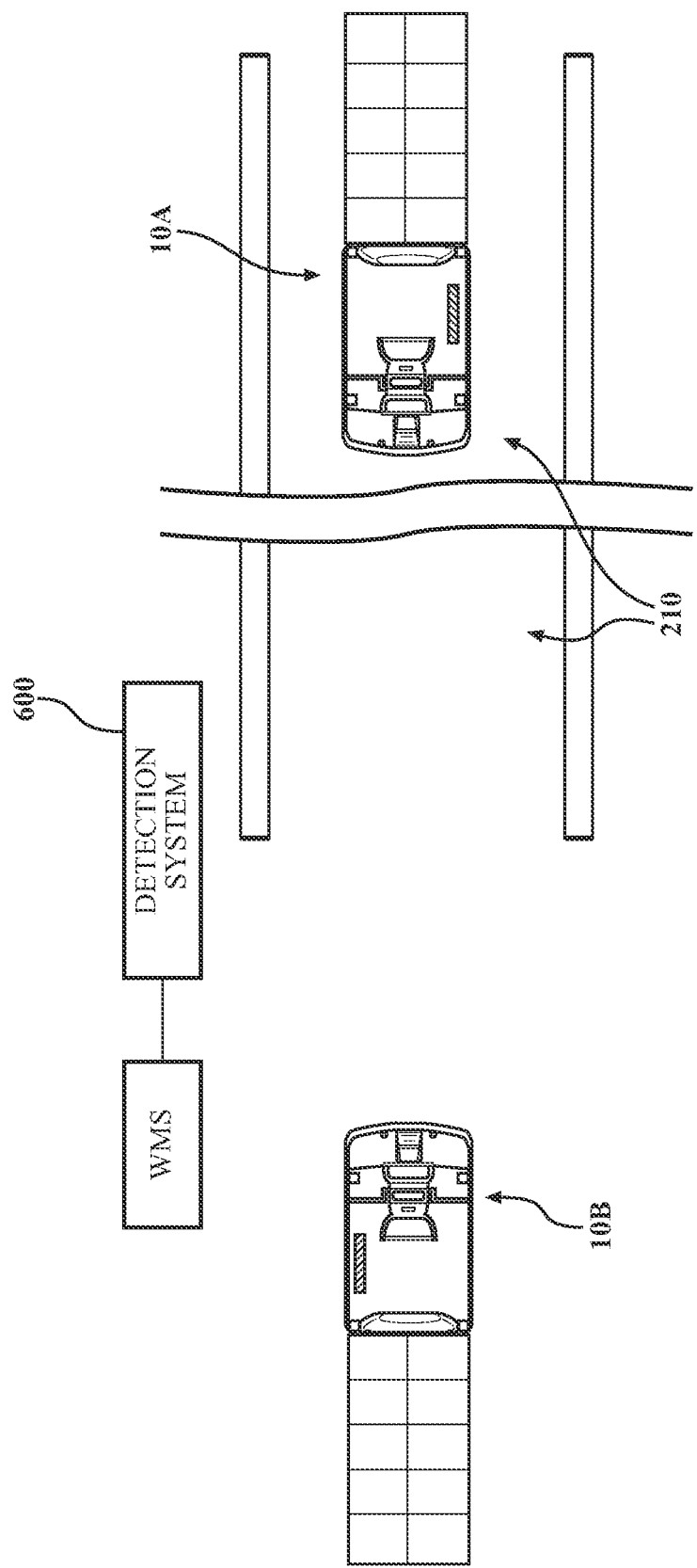
FIG. 9 is a schematic illustration of a detection system according to one or more embodiments shown and described herein.

With reference now to FIG. 9, a detection system 600 is provided for monitoring a designated area, such as an aisle 210 of a warehouse or other facility. The detection system 600 may be configured to prevent or discourage a second materials handling vehicle 10B from entering the designated area where a first materials handling vehicle 10A is already present. In this regard, the detection system 600 may be configured to provide a warning, e.g., warning sound or flashing light, to alert the operator of the second vehicle 10B not to enter the area. Alternatively, the detection system 600 may be configured such that the second vehicle 10B is prevented from moving into the designated area, for example, such as with travel override commands sent to the second vehicle 10B from the detection system 600 or from the warehouse manage system WMS (the detection system 600 would be in communication with the warehouse manage system WMS).

The detection system 600 could be mounted in the vicinity of the designated area, such as at the top of a rack, or on a wall or ceiling of the facility. Alternatively, the detection system 600 could be incorporated into the vehicles 10A, 10B themselves. For example, the vehicles 10A and 10B could know the location of each other, either by direct communication between the vehicles 10A, 10B, or through communication with the warehouse manage system WMS.

This embodiment may be particularly beneficial in a facility where space is limited, such as a facility having narrow aisles (e.g., where two vehicles would not fit side by side in the aisle), and also where vehicles are being controlled remotely, e.g., via wireless remote control devices 32 such as those disclosed herein.

The various features, aspects, and embodiments described herein can be used in any combination(s) with one another, or on their own.

Having thus described embodiments in detail, it will be apparent that modifications and variations are possible without departing from the scope of the appended claims.

What is claimed is:

1. A system comprising:
   a materials handling vehicle comprising one or more sensing devices for determining a first distance from a left side of the vehicle to a first boundary object and a second distance from a right side of the vehicle to a second boundary object and a controller coupled to the one or more sensing devices;
   a light source device coupled to the controller, the light source device being controlled by the controller to designate a first area to the left side of the vehicle as either a limited operation area or a non-limited operation area and to designate a second area to the right side of the vehicle as either a limited operation area or a non-limited operation area, the limited operation area corresponding to an area where the first or the second distance is less than a predetermined distance and the non-limited operation area corresponding to an area where the first or the second distance is greater than or equal to the predetermined distance;
   wherein, when one of the first or the second distance is less than the predetermined distance, the light source device designates the corresponding first or second area as a limited operation area in a first manner that can be observed by a person in the vicinity of the vehicle, and when concurrently the other of the first or the second distance is greater than or equal to the predetermined distance, the light source device designates the corresponding first or second area as a non-limited operation area in a second manner that can be observed by a person in the vicinity of the vehicle.

2. The system according to claim 1, wherein the light source device designates the first or the second area as either a limited operation area or a non-limited operation area with one or more light sources.

3. The system according to claim 2, wherein the one or more light sources illuminate at least a portion of a floor within the first area and illuminate at least a portion of the floor within the second area.

4. The system according to claim 2, wherein the vehicle comprises a load handling assembly and a power unit including an operator station, and wherein the one or more light sources illuminate at least a portion of a floor between: the load handling assembly and the first boundary object, the load handling assembly and the second boundary object, the power unit and the first boundary object, and the power unit and the second boundary object.

5. The system according to claim 2, wherein the one or more light sources are located on the vehicle.

6. The system according to claim 1, wherein the light source device will only be actuated when the vehicle is located in an aisle.

7. The system according to claim 1, wherein the first and/or the second boundary object is a wall or storage structure.

8. The system according to claim 1, wherein the predetermined distance comprises a first predetermined distance, and when the other of the first or the second distance is greater than or equal to the first predetermined distance but less than a second predetermined distance, the light source device designates the corresponding first or second area in a third manner with a third indicia that can be observed by an operator, the third manner being different than the first and the second manner, and the light source device further designates the corresponding first or second area in the second manner using a second indicia different from the third indicia since the other of the first or the second distance is greater than or equal to the first predetermined distance, wherein the light source generates the second indicia and third indicia concurrently.

9. The system according to claim 1, wherein the system further comprises a sensing system that detects that an operator has exited an operator station of the vehicle and whether the operator exited the operator station from a first exit on the left side of the vehicle or from a second exit on the right side of the vehicle; wherein if the left or the right side of the vehicle to which the operator exited the operator station is designated as a limited operation area, the controller modifies at least one function of the vehicle.

10. The system according to claim 9, wherein the at least one function of the vehicle that is modified comprises at least one of traction control, operation of a lift carriage of a load handling assembly of the vehicle or remote control operation of the vehicle.

11. A method for controlling a light source device forming part of a system, the system further comprising a materials handling vehicle, wherein the materials handling vehicle comprises one or more sensing devices, the method comprising:

sensing via the one or more sensing devices a first distance from a left side of the vehicle to a first boundary object and a second distance from a right side of the vehicle to a second boundary object;

controlling the light source device to designate a first area to the left side of the vehicle as either a limited operation area or a non-limited operation area and to designate a second area to the right side of the vehicle as either a limited operation area or a non-limited operation area, the limited operation area corresponding to an area where the first or the second distance is less than a predetermined distance and the non-limited operation area corresponding to an area where the first or the second distance is greater than or equal to the predetermined distance;

designating via the light source device, when one of the first or the second distance is less than the predetermined distance, the corresponding first or second area as a limited operation area in a first manner that can be observed by a person in the vicinity of the vehicle; and designating via the light source device, when concurrently the other of the first or the second distance is greater than or equal to the predetermined distance, the corresponding first or second area as a non-limited operation area in a second manner that can be observed by a person in the vicinity of the vehicle.

12. The method according to claim 11, wherein the light source device comprises one or more light sources.

13. The method according to claim 12, further comprising illuminating via the one or more light sources at least a portion of a floor within the first area and illuminating at least a portion of the floor within the second area.

14. The method according to claim 12, wherein the vehicle further comprises a load handling assembly and a power unit including an operator station, and wherein the one or more light sources illuminate at least a portion of a floor between: the load handling assembly and the first boundary object, the load handling assembly and the second boundary object, the power unit and the first boundary object, and the power unit and the second boundary object.

15. The method according to claim 12, wherein the one or more light sources are located on the vehicle.

16. The method according to claim 11, wherein the light source device will only be actuated when the vehicle is located in an aisle.

17. The method according to claim 11, wherein the first and/or the second boundary object is a wall or storage structure.

18. The method according to claim 11, wherein the predetermined distance comprises a first predetermined distance, and when the other of the first or the second distance is greater than or equal to the first predetermined distance but less than a second predetermined distance, the light source device designates the corresponding first or second area in a third manner with a third indicia that can be observed by an operator, the third manner being different than the first and the second manner, and the light source device further designates the corresponding first or second area in the second manner using a second indicia different from the third indicia since the other of the first or the second distance is greater than or equal to the first predetermined distance, wherein the light source generates the second indicia and third indicia concurrently.

19. The method according to claim 11, wherein the system further comprises a sensing system that detects that an operator has exited an operator station of the vehicle and whether the operator exited the operator station from a first exit on the left side of the vehicle or from a second exit on the right side of the vehicle; wherein if the left or right side of the vehicle to which the operator exited the operator station is designated as a limited operation area, a controller modifies at least one function of the vehicle.

20. The method according to claim 19, wherein the at least one function of the vehicle that is modified comprises at least one of traction control, operation of a lift carriage of a load handling assembly of the vehicle or remote control operation of the vehicle.

21. The method of claim 19, wherein the at least one function that has been modified is returned to its initial state when the operator returns to the operator station.

* * * * *